(12) United States Patent
Niculae et al.

(10) Patent No.: US 7,564,220 B2
(45) Date of Patent: Jul. 21, 2009

(54) METHOD AND ELECTRONIC CIRCUIT FOR EFFICIENT BATTERY WAKE UP CHARGING

(75) Inventors: Marian Niculae, San Jose, CA (US); Constantin Bucur, Santa Clara, CA (US)

(73) Assignee: O2Micro International Ltd., Georgetown (KY)

( * ) Notice: Subject to any disclaimer, the term of this patent is extended or adjusted under 35 U.S.C. 154(b) by 442 days.

(21) Appl. No.: 11/355,746

(22) Filed: Feb. 16, 2006

(65) Prior Publication Data

US 2006/0139005 A1    Jun. 29, 2006

Related U.S. Application Data

(63) Continuation-in-part of application No. 10/812,802, filed on Mar. 30, 2004, now Pat. No. 7,348,760, which is a continuation-in-part of application No. 10/652,110, filed on Aug. 29, 2003, now abandoned, which is a continuation-in-part of application No. 10/364,228, filed on Feb. 11, 2003, now Pat. No. 6,977,482, and a continuation-in-part of application No. 09/960,453, filed on Sep. 21, 2001, now Pat. No. 6,741,066.

(60) Provisional application No. 60/484,635, filed on Jul. 3, 2003, provisional application No. 60/234,442, filed on Sep. 21, 2000.

(51) Int. Cl.
*H02J 7/00* (2006.01)

(52) U.S. Cl. .................. 320/131; 320/132; 320/134; 320/136

(58) Field of Classification Search .......... 320/131–136
See application file for complete search history.

(56) References Cited

U.S. PATENT DOCUMENTS

| 5,760,570 | A | 6/1998 | Nagai et al. |
|---|---|---|---|
| 6,177,779 | B1 | 1/2001 | Eguchi |
| 6,313,610 | B1 * | 11/2001 | Korsunsky ............ 320/134 |
| 6,414,465 | B1 * | 7/2002 | Banks et al. .......... 320/118 |
| 6,744,234 | B2 * | 6/2004 | Odaohhara et al. ....... 320/100 |

FOREIGN PATENT DOCUMENTS

| JP | 08140281 A | 5/1996 |
|---|---|---|
| JP | 11-164489 | 6/1999 |
| JP | 2002142380 A | 5/2002 |

* cited by examiner

*Primary Examiner*—Akm E Ullah
*Assistant Examiner*—Richard V Muralidar
(74) *Attorney, Agent, or Firm*—Wang Law Firm, Inc.; Li K. Wang

(57) ABSTRACT

A method for efficiently charging a battery. The method includes producing a first signal having a voltage level dependent on the voltage of the battery, comparing the voltage level of the first signal with a settable voltage representative of a maximum battery charging current, and producing a second signal representative of a charging current to be provided to the battery, the second signal having a voltage level selected to be the lower voltage level between the first signal and the settable voltage.

26 Claims, 21 Drawing Sheets

METHOD AND ELECTRONIC CIRCUIT FOR EFFICIENT BATTERY WAKE UP CHARGING

CROSS REFERENCE TO RELATED APPLICATIONS

This application is a continuation-in-part of U.S. patent application Ser. No. 10/812,802, "POWER MANAGEMENT TOPOLOGIES," filed on Mar. 30, 2004 now U.S. Pat. No. 7,348,760, which itself is a continuation-in-part application of U.S. patent application Ser. No. 10/652,110 "POWER MANAGEMENT TOPOLOGIES," filed on Aug. 29, 2003 now abandoned, the teaching of which is hereby incorporated in their entirety by reference. The U.S. patent application Ser. No. 10/652,110 is a continuation-in-part application of U.S. patent application Ser. No. 10/364,228 filed Feb. 11, 2003, now U.S. Pat. No. 6,977,482 "SELECTOR CIRCUIT FOR POWER MANAGEMENT IN MULTIPLE BATTERY SYSTEMS" issued on Dec. 20, 2005, the teachings of which are incorporated herein by reference, and claims the benefit of the filing date of the U.S. Provisional Patent Application Ser. No. 60/484,635, filed on Jul. 3, 2003, the teachings of which are also incorporated herein by reference. The U.S. patent application Ser. No. 10/652,110 is also a continuation-in-part of the U.S. patent application Ser. No. 09/960,453 filed on Sep. 21, 2001, now U.S. Pat. No. 6,741,066 "POWER MANAGEMENT FOR BATTERY POWERED APPLIANCES" issued on May 25, 2004, the teachings of which are incorporated herein by reference, and claims the benefit of the filing date of U.S. Provisional Patent Application Ser. No. 60/234,442, filed Sep. 21, 2000, the teachings of which are also incorporated herein by reference.

BACKGROUND OF THE INVENTION

1. Field of the Invention

The invention relates to power management topology, and more specifically to battery charge controllers.

2. Description of the Related Art

Various portable electronic devices have a power supply system that monitors, controls, and directs power from various power sources to supply power to the system load of the electronic device. These power sources generally include a fixed output ACDC adapter and one or more rechargeable batteries. The power supply system contains a power conversion block, e.g., a DC to DC converter to convert a fixed DC voltage supplied by the ACDC adapter to a finely controlled variable output DC voltage to charge the battery.

The power supply system operates to supply power to the system from either the ACDC adapter or from the host battery and to perform battery charging if proper conditions are met. As such, there is typically an ACDC source switch for selectively coupling the ACDC adapter to the system, a Battery switch for selectively coupling the host battery to the system, and a charging switch that may connect the host battery to an output of the DC to DC converter for charging. When power is supplied to the system from the ACDC adapter, the ACDC source switch is closed, the Battery switch is open, and the charging switch may either be open or closed. In contrast, when power is supplied to the system from the battery, the Battery switch is closed, and the ACDC source switch and the charging switch are open.

In order to be able to charge the battery up to its maximum operating voltage, the output voltage of the ACDC adapter is chosen to be higher (usually at least 1 to 2 V higher) than the maximum operating voltage of the battery. Since the output voltage of the ACDC adapter has a fixed value while the output voltage of the battery may vary largely (depending on its charged state) the ACDC adapter and the battery can not be coupled in parallel to supply power to the system load at certain times. This difference in voltage would lead to undesirable inter-current flow from the higher voltage source (ACDC adapter) to the lower voltage source (battery). As a result, in order to account for transient high power needs of the system, the ACDC adapter is typically oversized, significantly increasing the cost of the power supply system.

In addition, since the ACDC adapter's output voltage is fixed, its output voltage cannot be used to charge the battery which entails fine charging voltage and current control. As such, a second power conversion step accomplished by the DC to DC converter is compulsory. This second power conversion step causes further cost increase and diminishes the overall efficiency of the power supply system.

Accordingly, there is a need in the art for power management topologies that enables only one power conversion to provide a controllable DC output to the system load and the battery, or enables a controllable DC power source and battery to be coupled in parallel to supply the system load, or has both features.

SUMMARY OF THE INVENTION

The present invention advantageously provides a method and a circuit for efficient battery charging. As a result, the goal of reducing battery charging time and cost saving can be achieved.

There is provided a method for charging a battery. The method includes the steps of producing a first signal having a voltage level dependent on the voltage of the battery, comparing the voltage level of the first signal with a settable voltage representative of a maximum battery charging current, and producing a second signal representative of a charging current to be provided to the battery. The second signal has a voltage level selected to be the lower voltage level between the first signal and the settable voltage.

There is provided a variable wake up level circuit for providing a wake up signal representative of a charging current to be delivered to a battery. The variable wake up level circuit includes a signal processing circuit, and a comparison circuit. The signal processing circuit may be a summing-type circuit receiving a first settable voltage representative of a minimum wake up current and a third signal representative of a battery voltage. The signal processing circuit is adapted to produce a first output signal with a voltage level dependent on the voltage levels of the first settable voltage and the third signal. The comparison circuit is adapted to receive the first output signal and a second settable voltage representative of a maximum allowable wake up current and to produce the wake up signal. The wake up signal has a voltage with a lower voltage level selected between the first output signal and the second settable voltage.

There is also provided a variable wake up current circuit for at least setting and controlling a wake up current delivered to a battery via a current flow controlling device connected in series in the battery charging path. The variable wake up current circuit includes a variable wake up level circuit, an error amplifier, and a driving circuit. The variable wake up level circuit is responsive to a first signal representative of the instantaneous voltage of the battery, a first settable voltage representative of a minimum wake up current of the battery and a second settable voltage representative of a maximum allowable wake up current of the battery. The variable wake up level circuit is further capable of generating a wake up signal representative of the wake up current for charging the battery. The wake up signal has a voltage level dependent at least on the voltage levels of the first settable voltage and the first signal. The error amplifier receives the wake up signal and a battery current sense signal representative of an instantaneous charging current of the battery flowing through the current flow controlling device. The error amplifier generates an error signal in response to the difference between the levels of the wake up signal and the battery current sense signal. The driving circuit is adapted to output a device driving signal in response to at least the error signal. The device driving signal is capable of commanding the current flow controlling device to maintain the instantaneous charging current at a level based on the wake up signal.

There is also provided a battery charging apparatus. The battery charging apparatus includes a current path toward a rechargeable battery, a current flow controlling device coupled in series with the current path, and a variable wake up current circuit. The current flowing controlling device is adapted to control a charging current delivered to the battery. The variable wake up current circuit being is to provide a device driving signal to the current flow controlling device in response to at least a first signal representative of an instantaneous voltage of the battery, a first settable voltage representative of a minimum value of a wake up charging current of the battery, a second settable voltage representative of a maximum allowable wake up charging current of the battery, and a battery current sense signal representative of the instantaneous charging current of the battery. The current flow controlling device is adapted to receive the device driving signal on a command terminal and to maintain the charging current at a level dependent on the voltage level of the device driving signal.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION OF THE INVENTION

Figure 1:
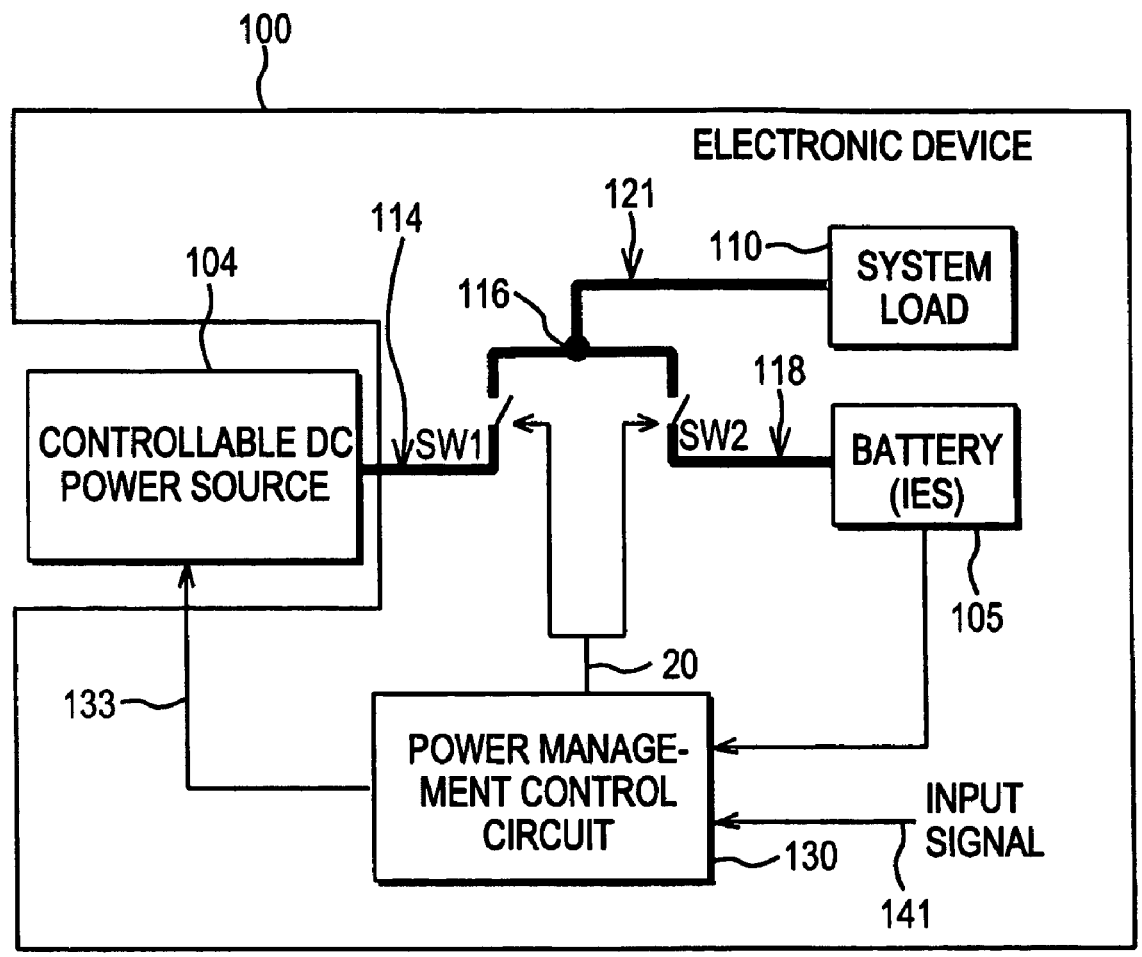
FIG. 1 is a high-level block diagram of an electronic device having a power supply topology including a controllable DC power source and a power management control circuit consistent with the invention.

FIG. 1 illustrates a simplified block diagram of an electronic device 100 having a system load 110 capable of being powered by a controllable DC power source 104, a battery 105, or by both in parallel as the need arises as further detailed herein. A table 180 showing the position of switches SW1 and SW2 in various power supply modes is also illustrated. In one embodiment, the controllable DC power source 104 may be a controllable adapter as further detailed herein, e.g., an ACDC adapter, that provides the only power conversion necessary to deliver power to the system load 110 and the battery 105. As such, the need for an additional power conversion step (e.g., a DC to DC converter to provide a finely controlled output to the battery for charging) typically utilized in other power supply systems is obviated in this instance.

The electronic device 100 may be any variety of devices known in the art such as a laptop computer, cell phone, personal digital assistant, power tool, electric powered vehicle, etc. The controllable DC power source 104 provides a dynamically controllable DC output such as may be available from a controllable adapter or a DC to DC converter as further detailed herein with reference to various embodiments. The controllable DC power source 104 may be separate from or integral with the electronic device 100. The battery 105 may include one battery or a plurality of batteries. A battery may be a rechargeable battery of various types such as lithium-ion, nickel-cadmium, nickel-metal hydride batteries, or the like.

The controllable DC power source 104 may be selectively coupled to a node 116 via switch SW1 and path 114. The battery 105 may be selectively coupled to the node 116 via switch SW2 and path 118. The system load 110 may be further coupled to the node 116 via path 121.

In general, a power management control circuit 130 consistent with the invention monitors, controls, and directs power from each power source 104, 105 to the system load 110 and each other (e.g., battery charging) under various conditions. The power management control circuit 130 may receive a variety of input signals along path 141. Such input signals may detail various load conditions, supply conditions, and/or command signals. The supply condition of the battery 105 may be a power condition such as an output voltage level or an output current level of the battery 105. Similarly, the supply condition of the controllable DC power source 104 may be a power condition such as an output voltage level or an output current level of the source 104. The load condition of the system load 110 may be a power condition such as a required voltage level or required current level of the system load at any particular instant. Those skilled in the art will recognize a variety of ways to provide such input signals to the power management control circuit 130. For instance, a current sense resistor may be provided in series with respective power paths 114, 118, 121 to provide a signal representative of a current level along each respective path.

In general, the power management control circuit 130 may dynamically adjust an output parameter, e.g., an output voltage level, of the controllable DC power source 104 via an output control signal along path 133 and may select among a plurality of power supply modes by controlling the state of switches SW1 and SW2 via an output control signal along path 20.

Advantageously, in one embodiment, the power management control circuit 130 may select a power supply mode 185 as detailed in table 180 that enables both the controllable DC power source 104 and the battery 105 to be coupled in parallel to provide power to the system load 110. The problem in coupling the controllable DC power source 104 and the battery 105 in parallel is that a difference in voltage level between the two leads to an undesirable inter-current flow from the higher voltage source to the lower voltage source.

This undesirable inter-current flow can be prevented by unidirectional and selectively unidirectional switches to allow current flow in one direction but prevent it in another direction. For instance, switch SW2 may be a selectively unidirectional switch and switch SW1 may be a unidirectional switch as further detailed herein and indicated by the arrows in table 180 of permitted current flow in the buffer battery supply mode 185. In addition, switch SW2 may include a bidirectional discharge switch where undesirable inter-current flow between the controllable DC power source 104 and the battery 105 is controlled by maintaining the voltage level of the controllable DC power source 104 within a tolerance range of the voltage level of the battery 105 as the battery voltage changes, e.g., depending on its charging status.

This parallel supply mode 185 may be selected if instructed by a command signal received via path 141. This supply mode 185 may also be selected in response to a power crises condition. Such a power crises condition may occur when the system load 110 has a load requirement in excess of the maximum power available from the controllable DC power source 104 individually and in excess of the maximum power available from the battery 105 individually. Together however, the power sources may be able to provide enough power to satisfy the load requirement of the system load 110 for the necessary duration. Therefore, the controllable DC power source 104 may not need to be oversized to account for this situation.

In such a parallel power source supply mode 185, the power management control circuit 130 advantageously prevents cross conduction between the controllable DC power source 104 and the battery source 105 by controlling the states of switches SW1 and SW2. Switch SW2 may be a selectively unidirectional switch and switch SW1 may be a unidirectional switch. That is, switch SW2 may allow current flow in one direction only when closed depending on the selected power supply mode or switch SW2 may be open. Switch SW2 may be open when the system load 110 is being powered by the controllable DC power source 104 only (hence switch SW1 is closed) and no charging is taking place (power supply mode 181).

Switch SW2 may have a first discharging closed position in which current is generally only allowed to flow from the battery. For example, in this first discharging closed position current is allowed to flow from the battery 105 to the system load 110 but current is prevented from flowing towards the battery 105 from the controllable DC power source 104. In addition, switch SW2 may also have a second charging closed position in which current is only allowed to flow to the battery. For example, in this second charging closed position current is only allowed to flow to the battery 105 from the controllable DC power source 104 and prevented from flowing from the battery 105 to the system load 100. Switch SW1 may be a unidirectional switch that when closed it only allows current flow from the controllable DC power source 104 to node 116.

Hence in a parallel power supply mode 185 where both the controllable DC power source 104 and the battery 105 provide power to the system load 110, switch SW2 may be closed in the first discharging position and switch SW1 may be closed. Hence the battery 105 can supply current to the system load 110 but undesirable inter-current flow from the controllable DC power source 104 to the battery 105 is prevented by the switch SW2. In addition, undesirable inter-current flow from the battery 105 to the DC power source 104 is prevented by unidirectional switch SW1.

Those skilled in the art will recognize a variety of ways a selectively unidirectional switch may be implemented. For instance, a pair of switches coupled in series with each other, and an associated pair of diodes in parallel with each switch, may be utilized. A particular diode may block current flow in one direction while a closed switch may allow current flow in both directions.

Advantageously, the power management control circuit 130 may select another power supply mode 181 or 183 where the controllable DC power source 104 provides power to the system load 110. The battery 105 may be charged (supply mode 183 of table 180) or may not be charged (supply mode 181 of table 180) in such an instance. In these power supply modes, one of the input signals to the power management circuit 130 along path 114 may be representative of a power requirement of the system load 110, e.g., a voltage requirement, a current requirement, etc. Advantageously, the power management control circuit 130 may be responsive to such a signal to adjust an output parameter, e.g., output voltage level, output current level, etc., of the controllable DC power source 104 to follow the requirement of the system load 110. In one instance, the power management circuit 130 adjusts the output voltage level of the controllable DC power source 104 to be within a predetermined limit of the voltage requirement of the system load 110. As such, power losses and dissipation are limited.

Figure 2:
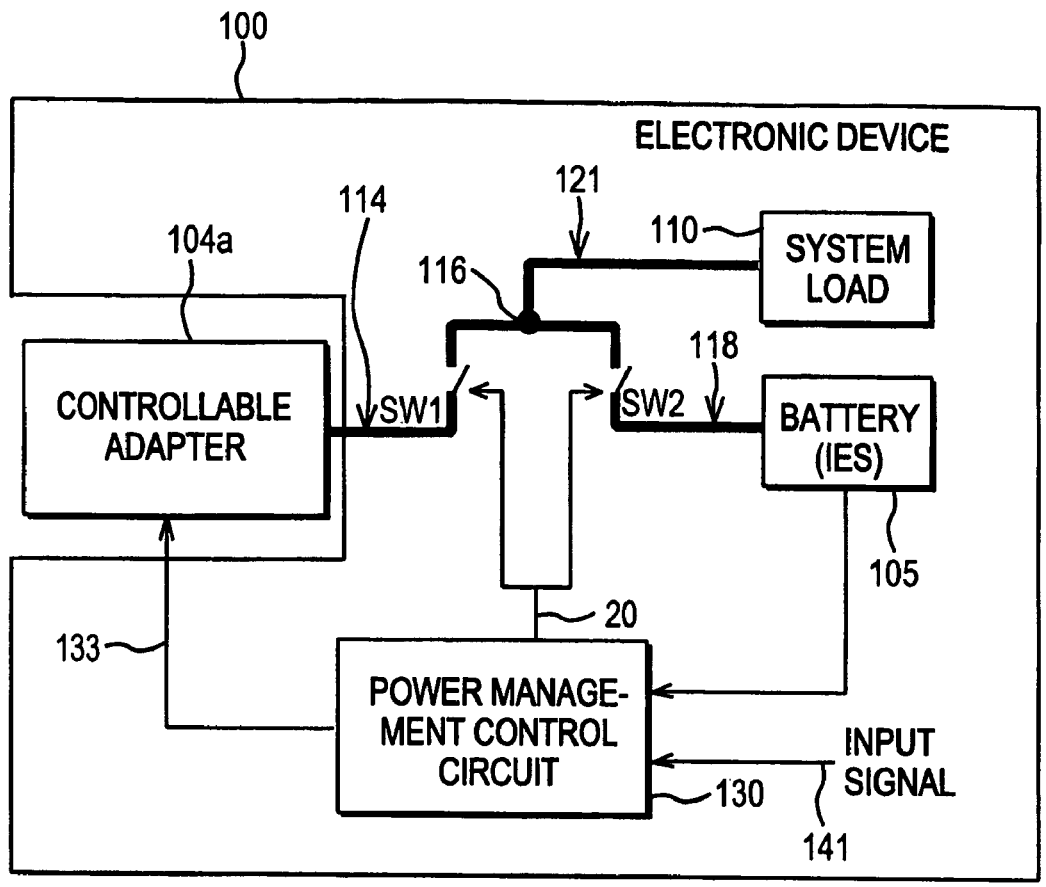
FIG. 2 is a high-level block diagram of one embodiment of a power supply topology of an electronic device consistent with FIG. 1 where the controllable DC power source is a controllable adapter.

Turning to FIG. 2, the controllable DC power source 104 of FIG. 1 may be a controllable adapter 104a. Advantageously in this instance there is only one power conversion step (e.g., from the input voltage to the controller adapter to the controllable output DC voltage) necessary to supply power to the system load 110 and to the battery 105 for charging. As such, the added power conversion step (e.g., from a DC to DC converter to the battery for charging) is avoided improving power efficiency. In the embodiment of FIG. 2, the buffer battery supply mode previously detailed may be (table 180) or may not be (table 190) available depending on the needs of the desired power supply system.

Other than the controllable adapter 104a other components of the power supply system of FIG. 2 are similar to that of FIG. 1 and, as such, are labeled similarly. Hence, any repetitive description of such components is omitted herein for clarity. The controllable adapter 104a may further be a controllable ACDC adapter that receives conventional AC voltage and converts it to a controllable DC voltage level in response to a control signal along path 133 from the power management control circuit 130. The parameters of the controllable adapter 104a that may be controlled by the power management control circuit 130 include, but are not limited to, output voltage, maximum output power, maximum output current, start-up time, start-up profile, etc. The output voltage of the controller adapter 104a may be dynamically adjusted as controlled by the power management control circuit 130.

Figure 3:
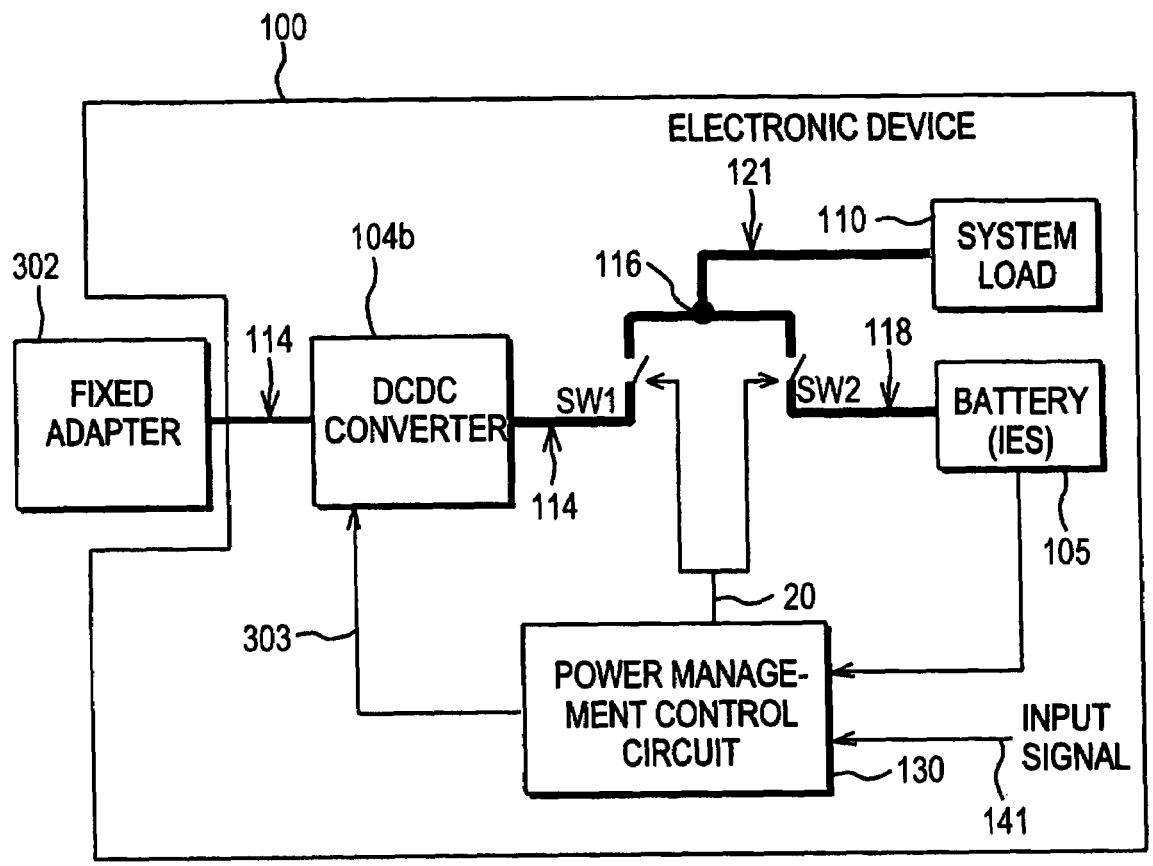
FIG. 3 is a high-level block diagram of another embodiment of a power supply topology of an electronic device consistent with FIG. 1 where the controllable DC power source is a DC to DC converter that may accept power from a fixed output adapter.

Turning to FIG. 3, the controllable DC power source of FIG. 1 may be a DC to DC converter 104b coupled to path 114. Also coupled to path 114 is a switch SW1 and fixed adapter 302. Switch SW1 is illustrated as coupled to path 114 between the DC to DC converter 104b and the node 116. Alternatively, switch SW1 may be coupled between the fixed adapter 302 and the DC to DC converter 104b along path 114 as is further detailed in other embodiments of FIGS. 9 through 15.

In the embodiment of FIG. 3, two power conversions are made rather than one power conversion as illustrated in FIG. 2. That is, the power conversion of the fixed adapter 302 and the DC to DC converter 104b. The embodiment of FIG. 3 still enables the power supply system to be operated in a buffer battery supply mode 185, e.g., to have the battery 105 and the controllable DC power source 104b provide power to the system load 110 concurrently as previously detailed. Other than the DC to DC converter 104b and fixed adapter 302, other components of the power supply system of FIG. 3 are similar to that of FIG. 1 and, as such, are labeled similarly. Hence, any repetitive description of such components is omitted herein for clarity.

The DC to DC converter 104b may be any variety of converters controlled by any variety of control signals along path 303 from the power management control circuit 130. In one embodiment, the DC to DC converter 104b may be a buck converter having a high side switch, a low side switch, and an LC filter as is known in the art. The control signal from the power management circuit 130 may be a pulse width modulated (PWM) signal. The width of the PWM signal controls the duration of the "switch ON" state (high side switch ON and low side switch OFF) and "switch OFF" state (high side switch OFF and low side switch ON) and hence the output voltage and current level of the DC to DC converter 104b.

Turning to FIGS. 4 through 8, various embodiments of power supply systems consistent with the invention are illustrated having a controllable adapter 104a as the controllable DC power source 104 and two batteries (Battery A and B). As such, the embodiments of FIGS. 4 through 8 have one power conversion due to the controllable adapter 104a to supply power to the system load 110 and the battery 105. The one step power conversion embodiments may be used independently of, or together with, the earlier detailed buffer battery power supply mode enabling both the battery and controllable DC power source to provide power to the system load 110.

In contrast, FIGS. 9 through 15 as further detailed herein are directed to additional embodiments having a controllable DC to DC converter 104b as the controllable DC power source 104 and also having two batteries (Batteries A and B). The embodiments of FIGS. 9 through 15 therefore have at least two power conversions due to a fixed adapter 302 and the DC to DC converter 104b.

Figure 4:
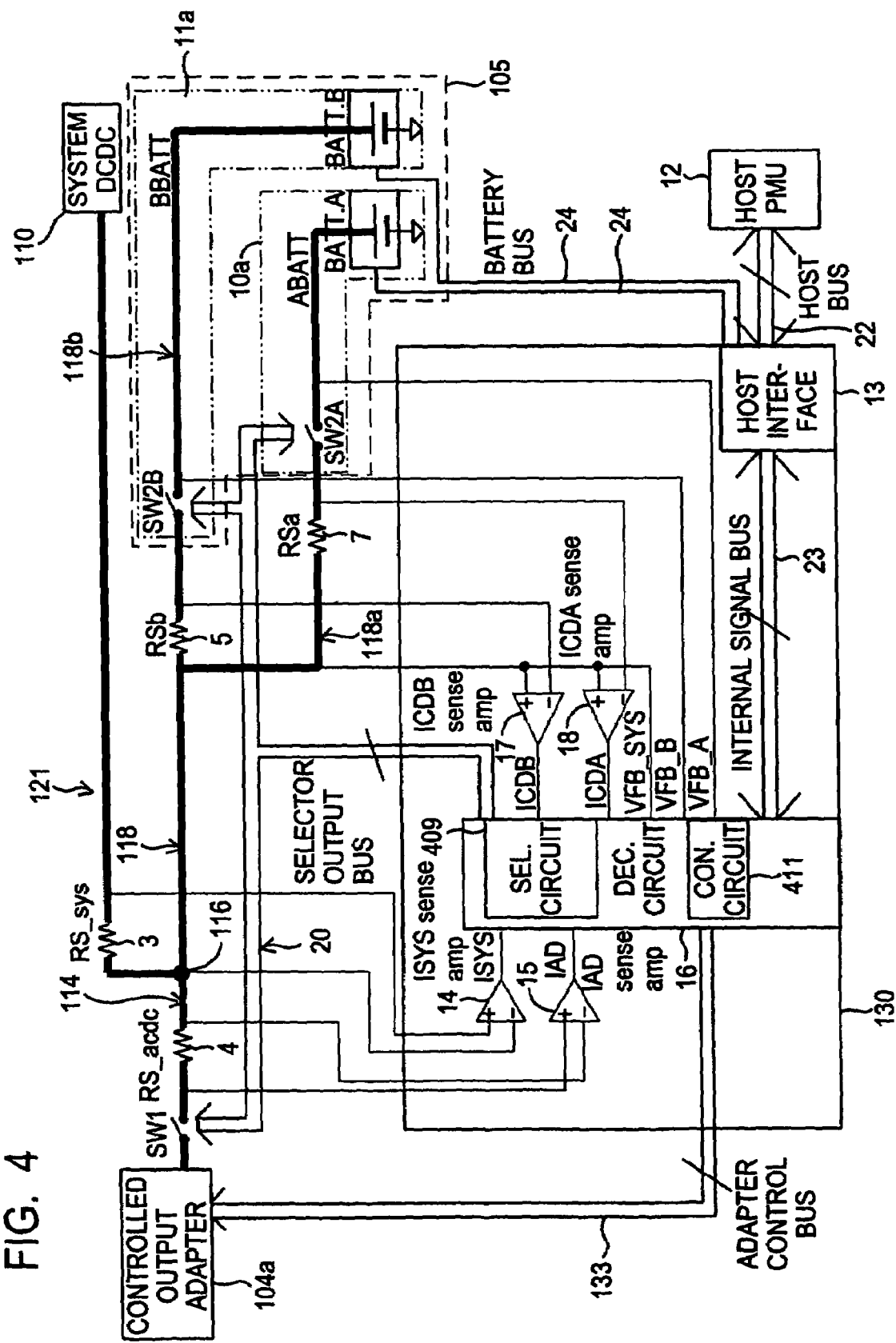
FIG. 4 is a more detailed block diagram of one embodiment of the power supply topology of FIG. 2 where the controllable DC power source is a controllable adapter, the battery source includes a plurality of batteries, and the power supply system includes an adapter sense resistor, a system sense resistor, and a sense resistor for each battery.
Figure 5:
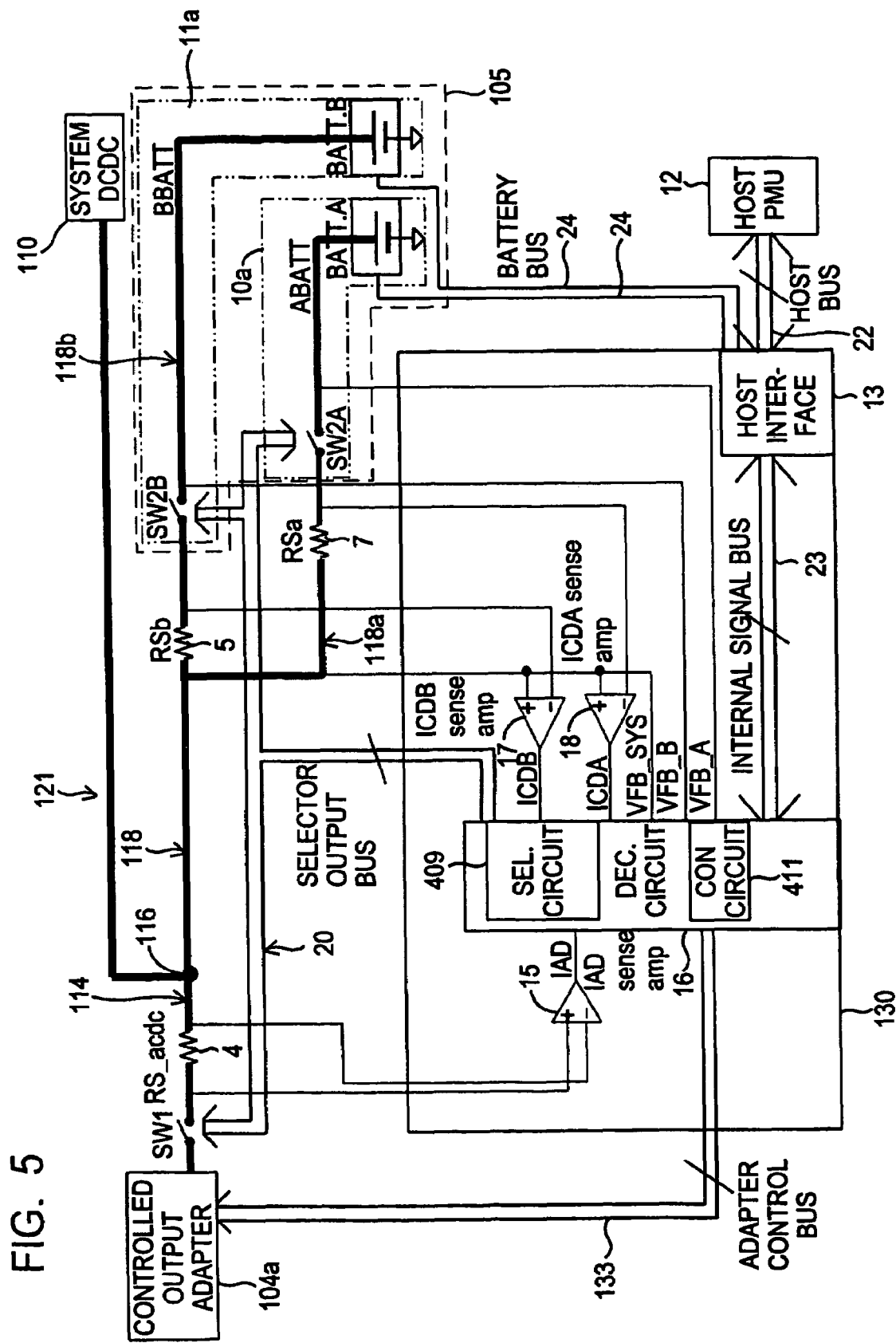
FIG. 5 is a more detailed block diagram of another embodiment of the power supply topology of FIG. 2 where the controllable DC power source is a controllable adapter, the battery source includes a plurality of batteries, and the power supply system includes an adapter sense resistor and a sense resistor for each battery.
Figure 6:
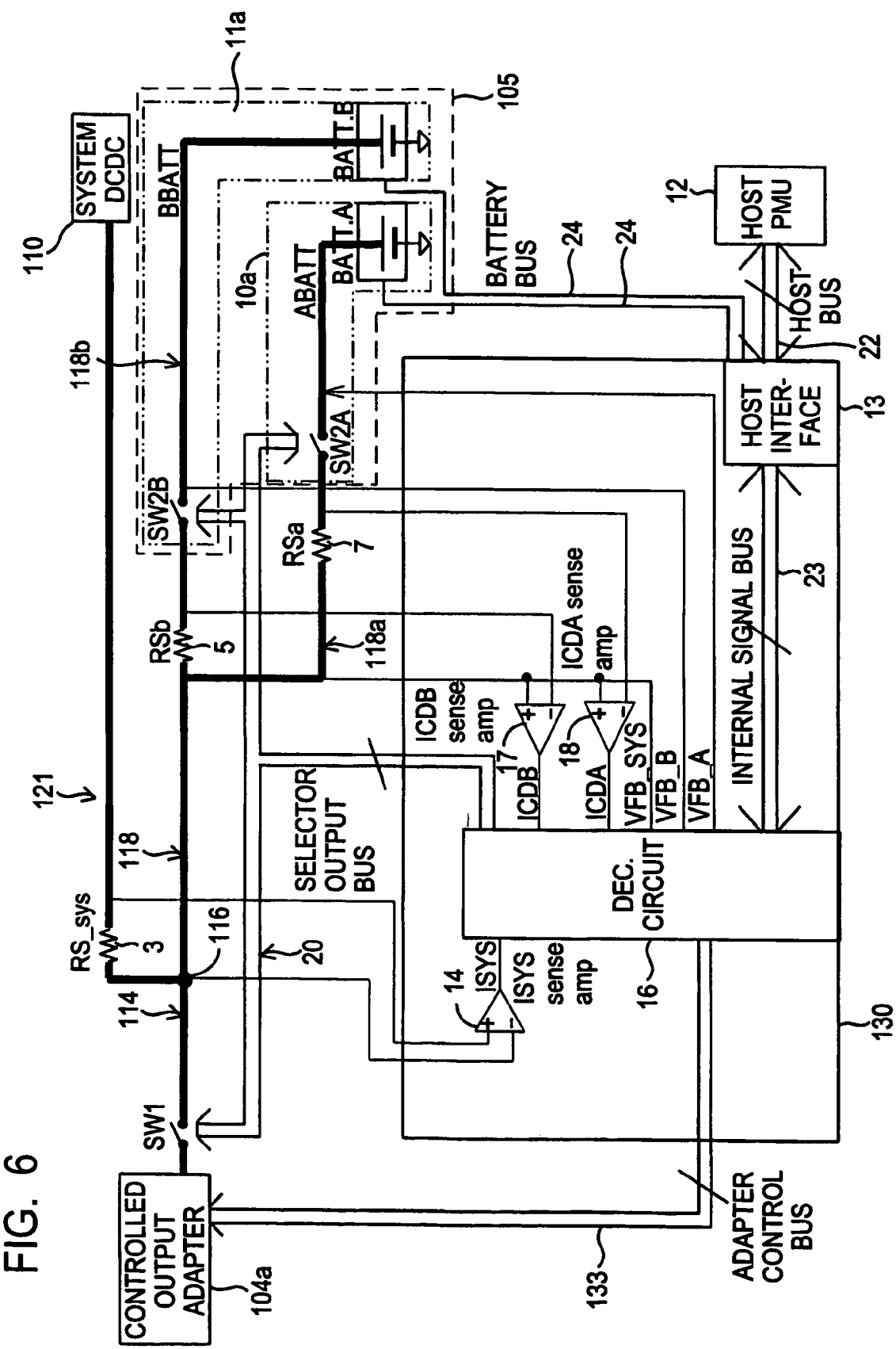
FIG. 6 is a more detailed block diagram of yet another embodiment of the power supply topology of FIG. 2 where the controllable DC power source is a controllable adapter, the battery source includes a plurality of batteries, and the power supply system includes a system sense resistor and a sense resistor for each battery.
Figure 7:
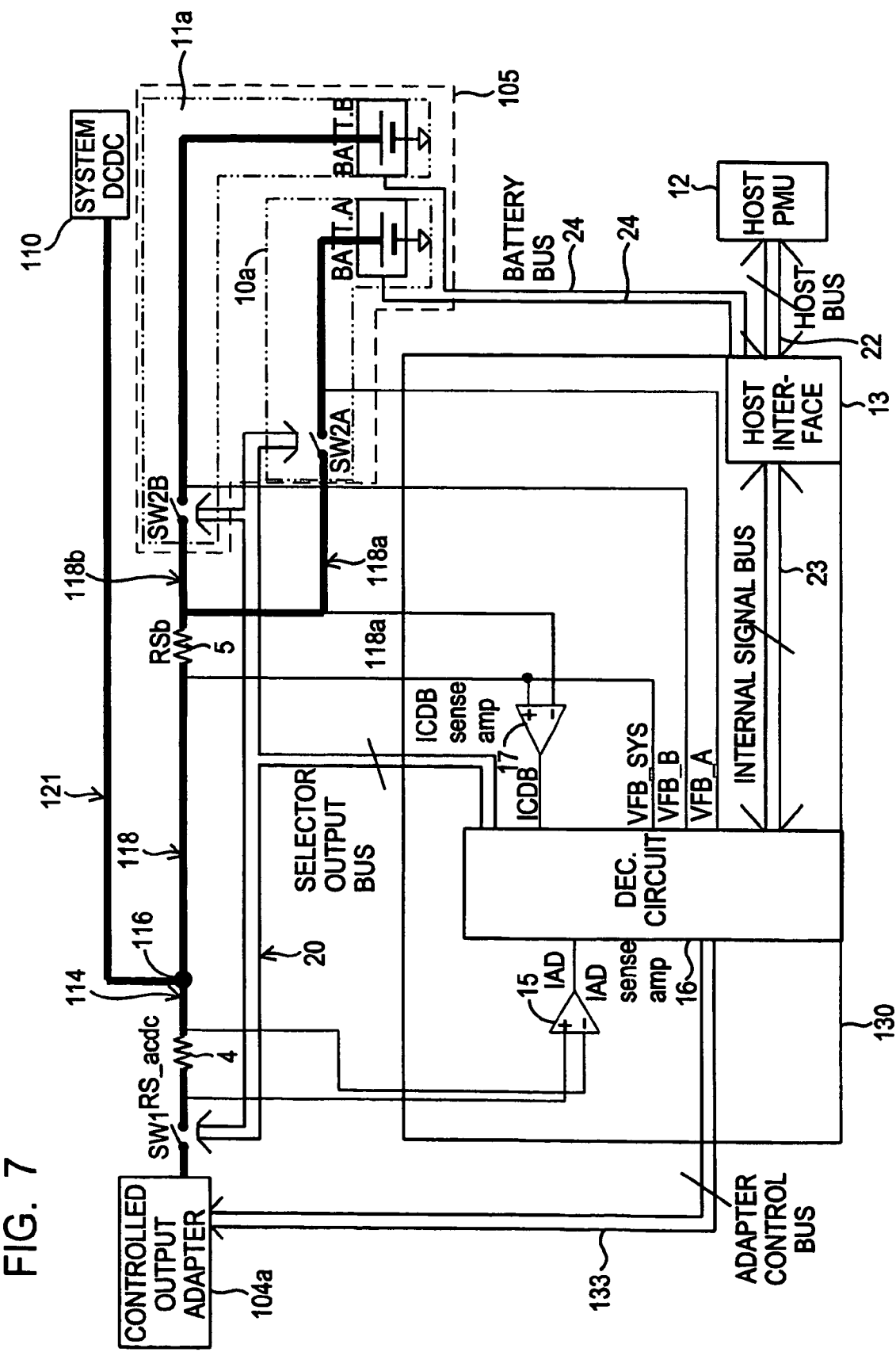
FIG. 7 is a more detailed block diagram of yet another embodiment of the power supply topology of FIG. 2 where the controllable DC power source is a controllable adapter, the battery source includes a plurality of batteries, and the power supply system includes an adapter sense resistor and one battery sense resistor for the battery source.
Figure 8:
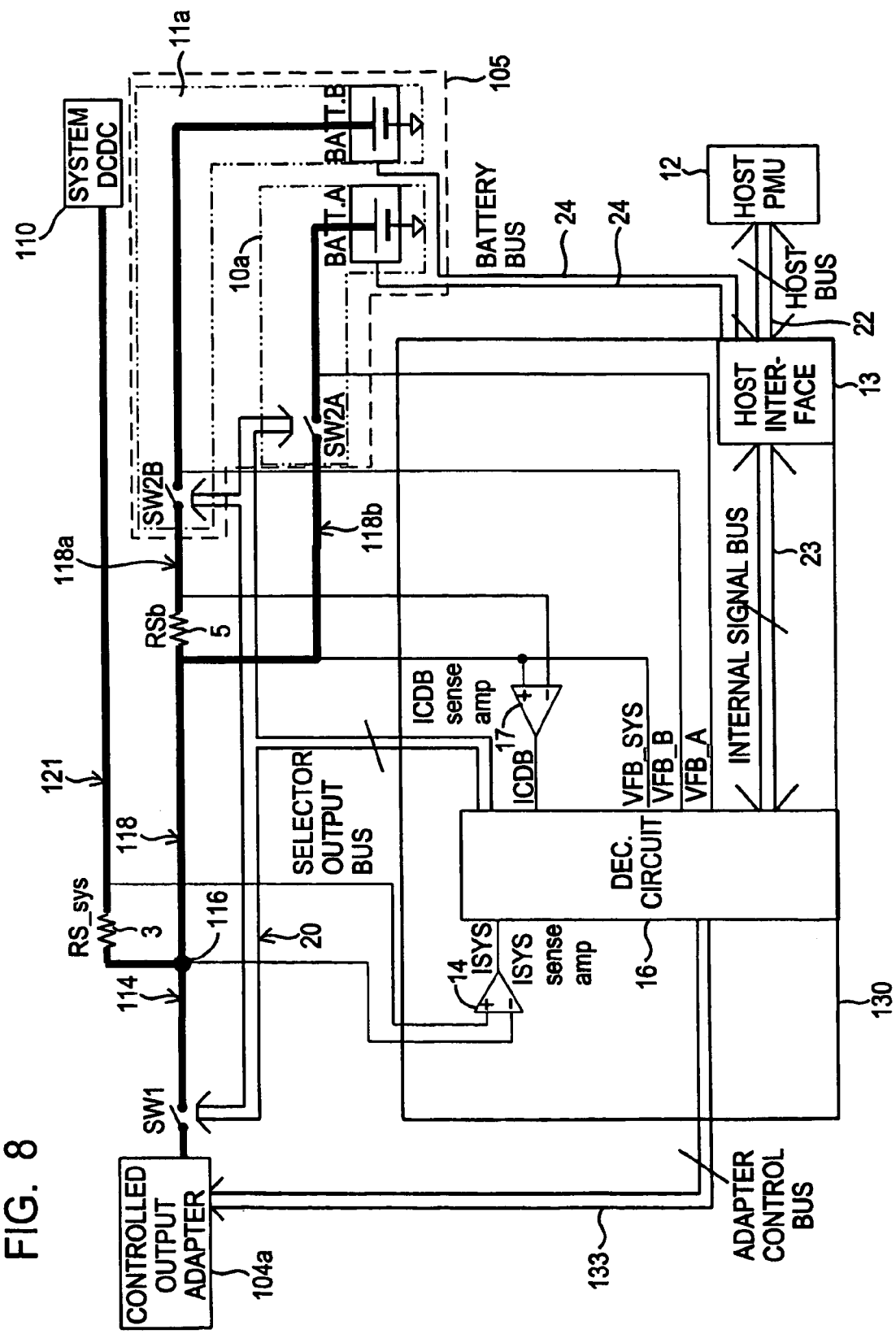
FIG. 8 is a more detailed block diagram of yet another embodiment of the power supply topology of FIG. 2 where the controllable DC power source is a controllable adapter, the battery source includes a plurality of batteries, and the power supply system includes a system sense resistor at the output of the DC to DC converter, and one battery sense resistor for a plurality of batteries.

The embodiment of FIG. 4 may have all the functionality earlier detailed regarding FIG. 1 and FIG. 2. However, the embodiment of FIG. 4 may or may not have the earlier detailed buffer battery power supply mode enabling both the battery and controllable DC power source to provide power in parallel to the system load 110. For instance, a particular power supply system may only desire the one step power conversion and not be concerned with the buffer battery power supply mode.

Some components of FIG. 4 are similar to those components of FIG. 2 and, as such, are labeled similarly. Hence, any repetitive description of the functionality and the repetitive components is omitted herein for clarity. In general, any one or combination of the controllable ACDC adapter 104a, Battery A, or Battery B may power the system load 110 at any one time as controlled by the power management control circuit 130. The system load 110 receives power via path 121 as seen at node 116. The controllable adapter 104a may be selectively coupled to node 116 via switch SW1 and path 114. Battery A may be selectively coupled to node 116 via switch SW2A and path 118a. Similarly, Battery B may be selectively coupled to node 116 via switch SW2B and path 118b. Switch SW1 may be a stand-alone external switch. Switch SW1 may also be a unidirectional switch as earlier detailed. Switches SW2A and SW2B could be stand-alone switches or embedded in battery packs 10a and 11a respectively, e.g., extended battery life approach. Using the power switches embedded in the battery pack would reduce the number of power switches and associated power dissipation. Switches SW2A and SW2B may also be selectively unidirectional switches as earlier detailed.

As earlier alluded, the power management control circuit 130 may receive a variety of input signals along a variety of paths. In the embodiment of FIG. 4, an adapter sense resistor 4, a system sense resistor 3, a Battery A sense resistor 7, and a Battery B sense resistor 5 provide input signals representative of the current level along the respective power paths to the power management control circuit 130. For instance, the adapter sense resistor 4 provides a data signal representative of current flow along path 114 from the controllable adapter 104a. The system sense resistor 3 provides a data signal representative of current flow along path 121 to the system load 110 from any combination of power sources. The Battery A sense resistor 7 provides a data signal representative of current flow along path 118a from or to Battery A. Finally, the Battery B sense resistor 5 provides a data signal representative of current flow along path 118b from or to Battery B.

In addition, input signals representative of the voltage level of Battery A (VFB_A), Battery B (VFB_B), and the system load (VFB_SYS) may also be input to the power management control circuit 130. Furthermore, input signals, e.g., command and data signals may also be input to the power management circuit 130 from a host power management unit (PMU) 12 via host bus 22. The PMU 12 is configured to run various power management routines as is known in the art. Such input signals from the PMU 12 may include, but are not limited to, charging current, charging voltage, adapter controlled preset voltage, adapter power limit, adapter current limit, adapter presence, battery presence, a number of alarm signals such as over-voltage, over-temperature, over current charge or adapter, over-power for the adapter 104a or the system 110. The host bus 22 may have any number of wires and carry any combination of analog and digital command signals. For example, the host bus 22 may be a SMBus if the PMU 12 is configured to run a SMBus protocol routine. The PMU 12 may be a separate component or it may be embedded in a more complex processor of the electronic device 100.

In addition, a battery bus 24 for Batteries A and B may provide additional information to the power management control circuit 130. Such information provided via such bus 24 may be representative of various parameters such as, but not limited to, charging current, charging voltage, battery presence, a number of alarm signals such as over-voltage, over-temperature, or over current.

Turning to the power management control circuit 130, it may include a host interface 13, a plurality of current sense amplifiers 14, 15, 17, 18, associated control and data paths, and a decision circuit 16. The decision circuit 16 may further include a selector circuit 409 to provide a first set of output signals via bus 20 to control the state of switches SW1, SW2A, and SW2B. The decision circuit 16 may also include a control circuit 411 to provide a second set of output signals via path 133 to control an output parameter of the controllable adapter 104a.

The host interface 13 is a generic interface configured to accept an input set of signals from the PMU 12 and to output a converted set of signals to the decision circuit 16 via internal signal bus 23. Such signals provided to the decision circuit 16 may contain voltage and current limits for Battery A, Battery B, the controllable adapter 104a, and the system load 110. The host interface 13 may accept analog or digital signals from the PMU 12.

If the PMU 12 provides digital signals, the host interface may be any variety of digital interfaces such as a SMBus or I2C interface. In this instance, a multiplexer (MUX) and digital to analog converter (DAC) may also be provided in the interface 13 to convert digital to analog signals and to provide the appropriate number of analog signals to the decision circuit 16. The MUX may have any number channels depending, in part, on the number of signals provided to the decision circuit 16.

The plurality of current sense amplifier 14, 15, 17, 18 amplifies signals from the respective sense resistors 3, 4, 5, 7 since the sense resistor is typically quite small. For instance, sense amplifier 14 amplifies the voltage drop across the system sense resistor 3 and provides an ISYS signal representative of the current flow along path 121. Sense amplifier 15 amplifies the voltage drop across the adapter sense resistor 4 and provides an IAD signal representative of the current flow along path 114. Sense amplifier 17 amplifies the voltage drop across the Battery B sense resistor 5 and provides an ICDB signal representative of current flow along path 118b. Finally, sense amplifier 18 amplifies the voltage drop across the Battery A sense resistor 7 and provides an ICDA signal representative of current flow along path 118a.

The ISYS, IAD, ICDB, and ICDA signals from the respective sense amplifiers 14, 15, 17, 18 may then be provided to the decision circuit 16, and in particular, to the control circuit 411 portion of the decision circuit 16. In addition, the VFB_SYS signal representative of the voltage level of the system load 110, the VFB_B signal representative of the voltage level of Battery B, and the VFB_A signal representative of the voltage level of Battery A may also be provided to the decision circuit 16, and in particular, to the control circuit 411 portion of the decision circuit 16.

The control circuit 411 accepts these input signals ISYS, IAD, ICDB, ICDA, VFB_SYS, VFB_B, and VFB_A and compares such signals to various threshold levels, e.g., as provided by the PMU 12. Based on such comparisons, the control circuit 411 provides the first set of output signals to control an output parameter, e.g., an output voltage level, of the adapter 104a via the adapter control bus 133.

The first set of output signals controls one or more output parameters of the controllable adapter 104a so that the power supply system performs a variety of tasks including those earlier detailed regarding FIGS. 1 and 2. In addition, such tasks may also include at least one of, but not limited to, the following:

1. providing all the necessary adapter current up to a maximum output current level of the adapter or up to the power supply limits of the system load 110, and if requested to provide charging current to charge the battery source 105;

2. Limiting the total charging current delivered to the battery 105 during a charging mode to the difference between the maximum output current level of the adapter 104a and the required current of the system load 110;

3. providing the maximum charging current to each battery (Battery A and B) as long as the maximum charging voltage level has not been reached for any of the batteries;

4. providing up to the maximum charging current to the lowest voltage battery as long as the maximum charging voltage has not been reached for any of the batteries; and 5. providing a set maximum supply voltage to the system load 110 when no battery is present or no charge request is received.

Those skilled in the art will recognize various ways that such functionality of the control circuit 411 portion of the decision circuit 16 may be accomplished through hardware only, software only, or some combination thereof. For instance, with hardware the control circuit 411 may include a plurality of error amplifiers to compare signals ISYS, IAD, ICDB, ICDA, VFB_SYS, VFB_B, and VFB_A with an associated maximum threshold level for each monitored parameter. The plurality of error amplifiers may be configured as an analog "wired-OR" topology such that the error amplifier that first detects a condition exceeding the associated maximum level controls the command signal to the controllable adapter 104a. An appropriate output signal may then be sent to the controllable adapter 104a, e.g., to lessen an output power parameter of the adapter 104a if a maximum threshold limit is reached.

The second set of output signals provided by the decision circuit 16 via the selector output bus 20 controls the state of switches SW1, SW2A, and SW2B to enable the power supply system to have various power supply modes. Such second set of output signals may be provided by the selector circuit 409 of the decision circuit 16. As a result, various power paths connecting the power sources (adapter 104a, Battery A, and Battery B) to the system load 110 and to each other (e.g., during charging) occur depending on actual supply conditions, events, and requests from the PMU 12. A variety of hardware and/or software may be utilized to process the variety of input signals to the selector circuit 409 portion of the decision circuit 16 according to a particular processing algorithm. The algorithm should be able to determine the appropriate driving signals to drives switches SW1, SW2A, and SW2B ON and OFF in order to accomplish a variety of tasks including at least one of, but not limited to, the following tasks:

1. ensuring an uninterrupted power supply to the system load 110 as long as at least one power source (ACDC adapter 104a, Battery A, Battery B) is present;

2. connecting the appropriate battery or batteries to a charging path as requested by the PMU 12;

3. connecting the appropriate battery or batteries to a discharging path to supply power to the system load 110 as requested by the PMU 12;

4. voiding cross conduction between batteries when a number of batteries are coupled in parallel and between the ACDC adapter and the batteries in parallel supply mode;

5. independently solving any power crises event such as power source connection/disconnection, short circuits, and the like; and 6. independently and safely managing the power supply system when the host PMU 12 fails to send the appropriate control signal.

To accomplish such tasks, especially such tasks dependent on use of two or more batteries (e.g., to avoid cross conduction between batteries), reference should be made to U.S. patent application Ser. No. 10/364,228 filed Feb. 11, 2003, the teachings of which are incorporated herein by reference, which discloses a selector circuit that may be utilized as part of a power supply system consistent with the invention.

Turning to FIGS. 5-8, various additional embodiments of power supply systems consistent with the invention of FIGS. 1 and 2 are illustrated having a controllable adapter 104a and two batteries (Battery A and B). In general, the main difference between the embodiments of FIGS. 5-8 and that earlier detailed regarding FIG. 4 is in the number of sense resistors utilized along various power paths. Otherwise, the functionality of the embodiments is similar to that earlier described with reference to FIG. 4 except that the decision circuit may not receive as many input current signals if less sense resistors are utilized. The embodiment of FIG. 5 has an adapter sense resistor 4, a Battery A sense resistor 7, and a Battery B sense resistor 5. The embodiment of FIG. 6 has a system sense resistor 3, a Battery A sense resistor 7, and a Battery B sense resistor 5. The embodiment of FIG. 7 has an adapter sense resistor 4, and one battery sense resistor 5 sensing current flow along path 118. Finally, the embodiment of FIG. 8 has a system sense resistor 3 and one battery sense resistor 5 sensing current flow along path 118.

Turning to FIGS. 9-15, various additional embodiments of power supply systems consistent with the invention of FIGS. 1 and 3 are illustrated having a DC to DC converter 104b as the controllable DC power source 104, a fixed adapter 302, and two batteries (Battery A and B) as the battery source 105. In general, the main difference between the embodiments of FIGS. 9-15 and that earlier detailed regarding FIGS. 1 and 3 is in the number and position of sense resistors utilized along various power paths.

Figure 9:
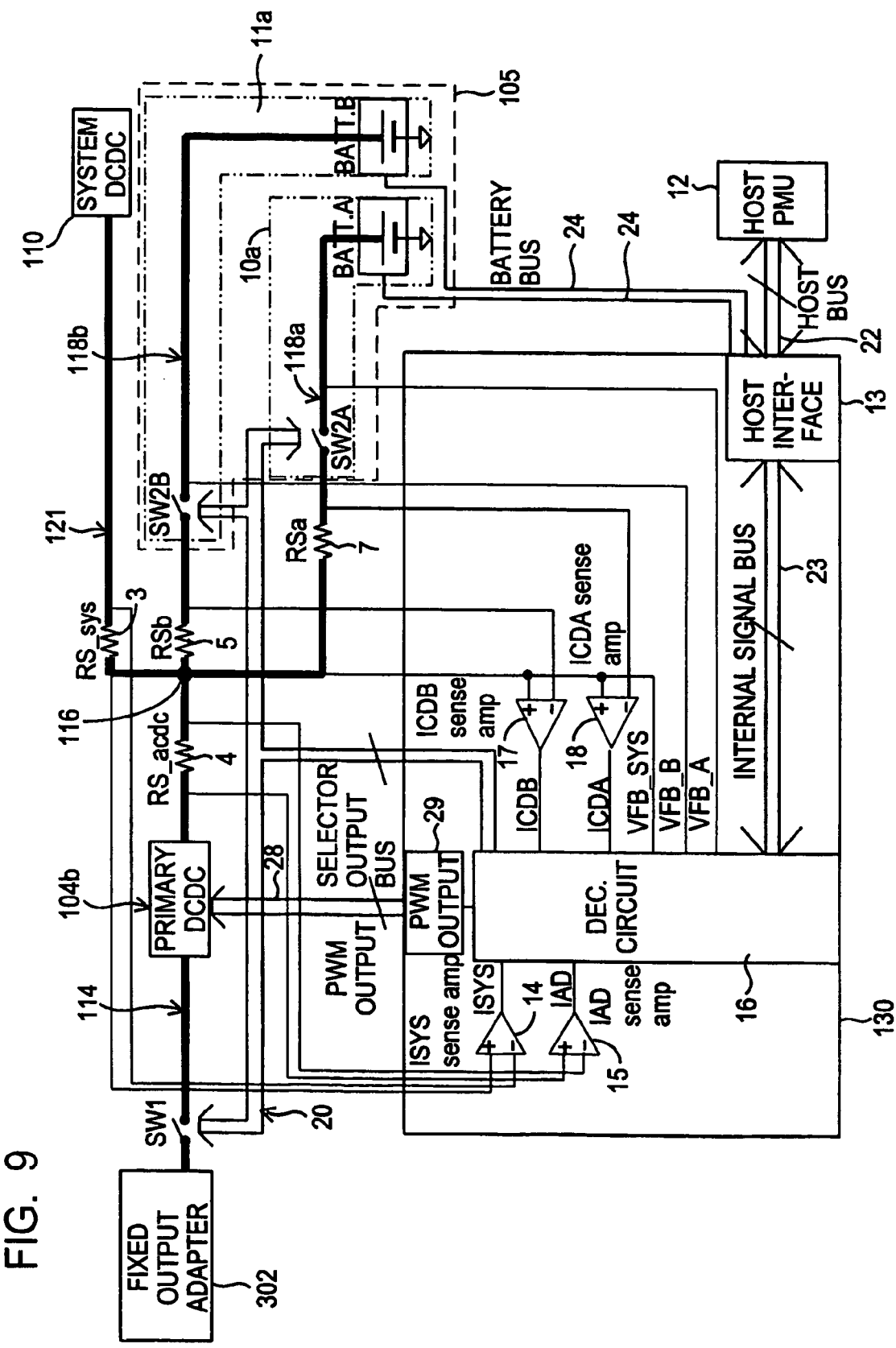
FIG. 9 is a more detailed block diagram of yet another embodiment of the power supply topology of FIG. 3 where the controllable DC power source is a DC to DC converter, the battery source includes a plurality of batteries, and the power supply system includes a DC to DC converter sense resistor at the output of the DC to DC converter, a system sense resistor, and one battery sense resistor for each battery.
Figure 10:
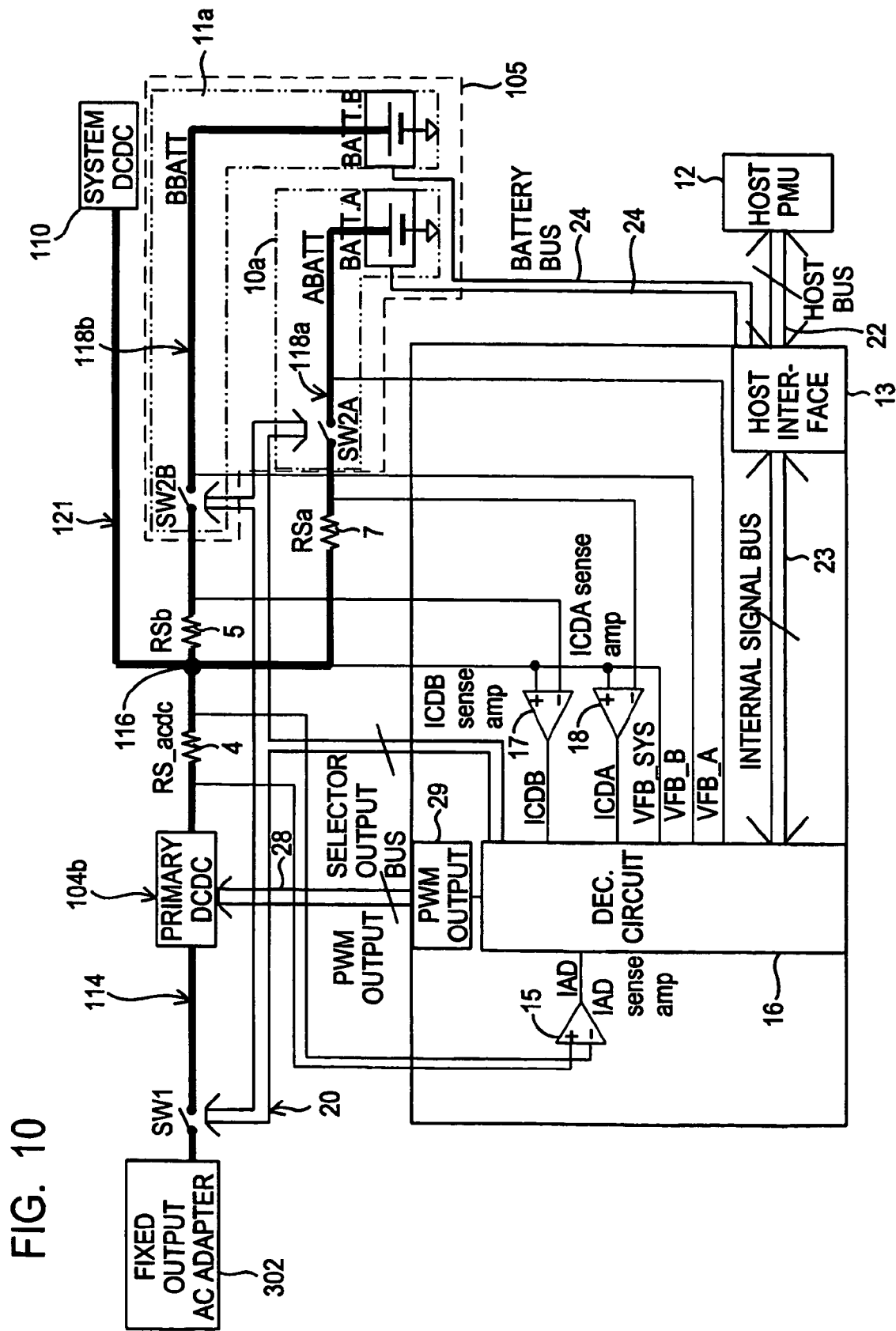
FIG. 10 is a more detailed block diagram of yet another embodiment of the power supply topology of FIG. 3 where the controllable DC power source is a DC to DC converter, the battery source includes a plurality of batteries, and the power supply system includes a DC to DC converter sense resistor at the output of the DC to DC converter and a sense resistor for each battery.
Figure 11:
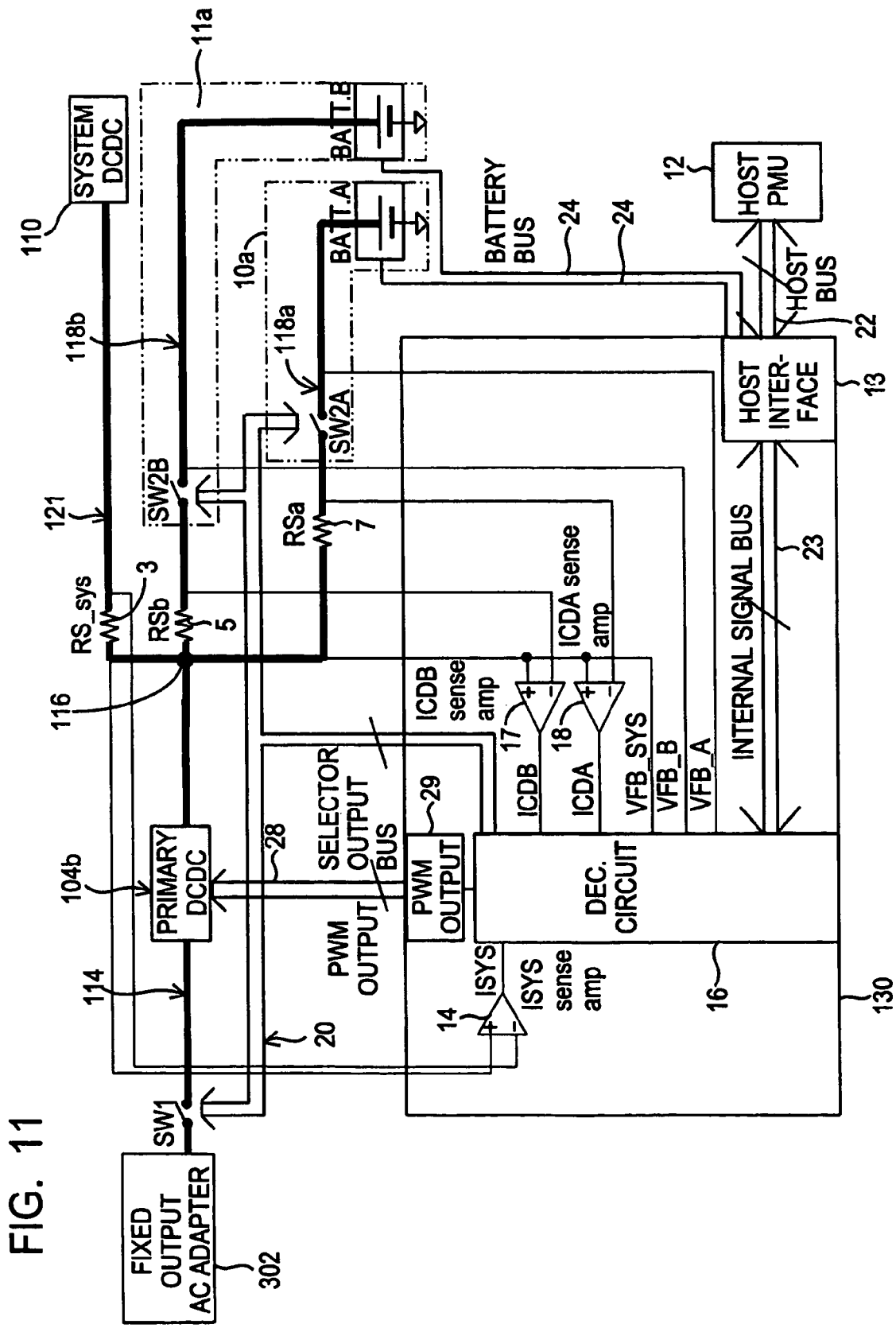
FIG. 11 is a more detailed block diagram of yet another embodiment of the power supply topology of FIG. 3 where the controllable DC power source is a DC to DC converter, the battery source includes a plurality of batteries, and the power supply system includes an system sense resistor and a sense resistor for each battery.
Figure 12:
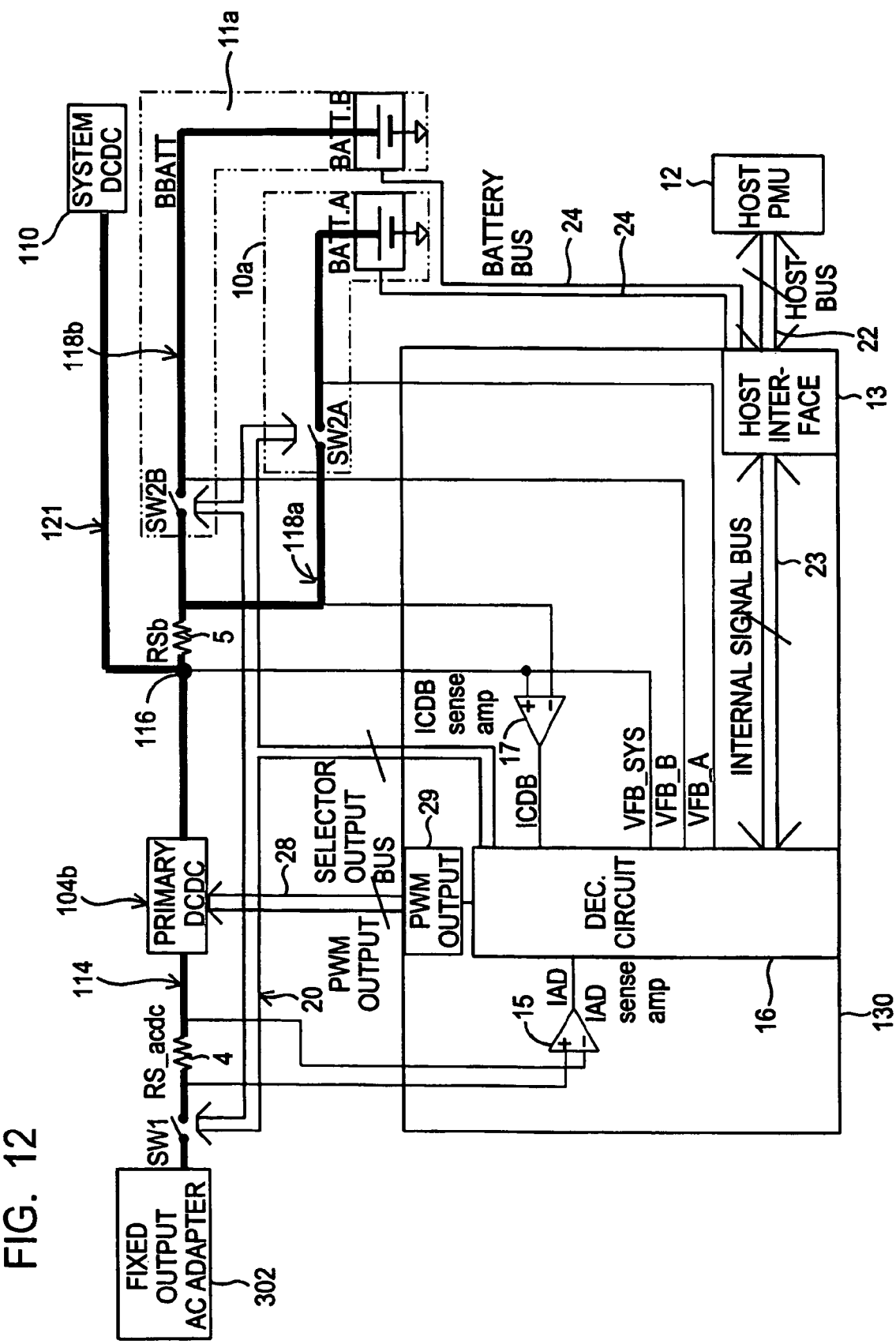
FIG. 12 is a more detailed block diagram of yet another embodiment of the power supply topology of FIG. 3 where the controllable DC power source is a DC to DC converter, the battery source includes a plurality of batteries, and the power supply system includes an adapter sense resistor and one battery sense resistor for the battery source.
Figure 13:
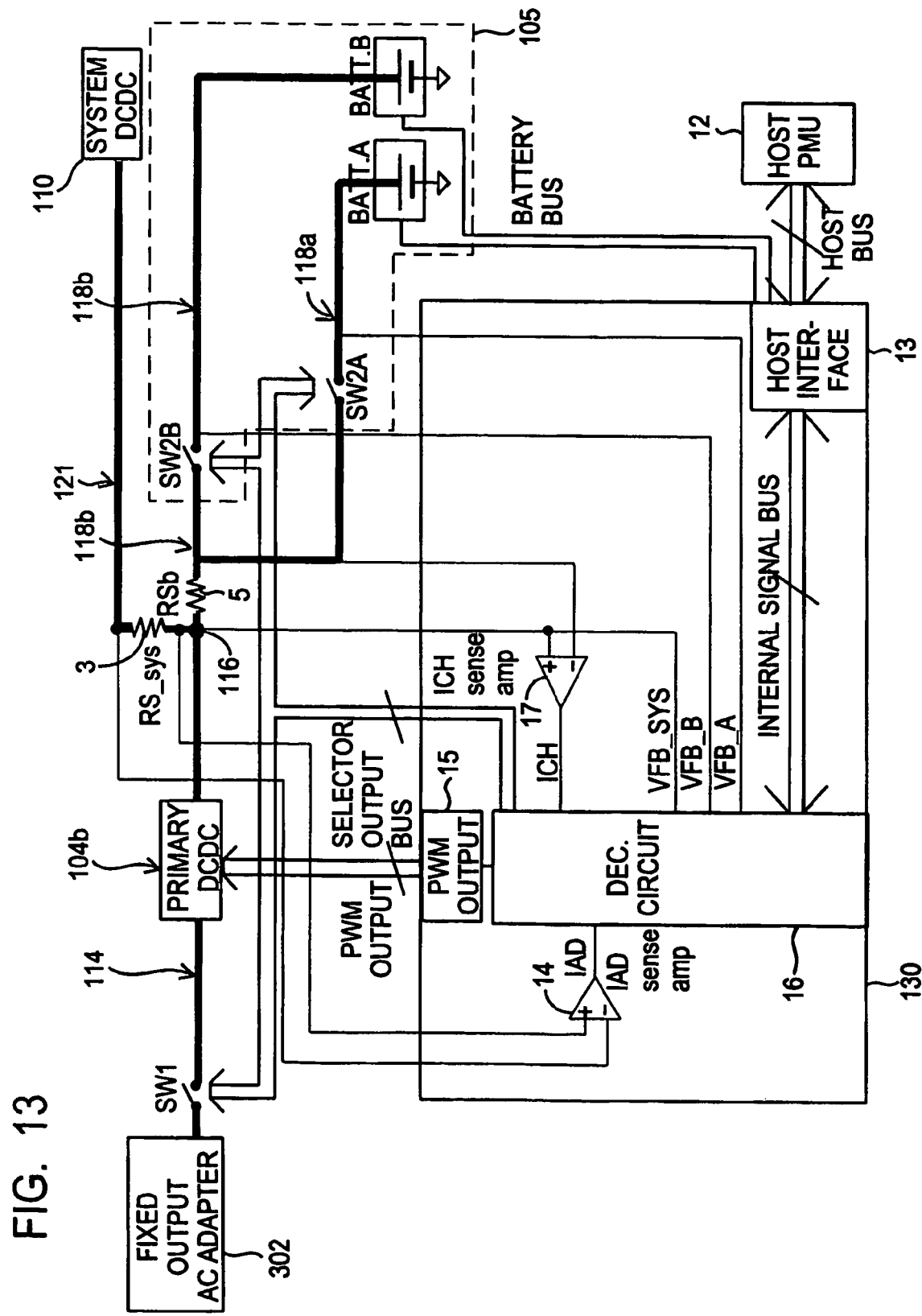
FIG. 13 is a more detailed block diagram of yet another embodiment of the power supply topology of FIG. 3 where the controllable DC power source is a DC to DC converter, the battery source includes a plurality of batteries, and the power supply system includes a system sense resistor and one battery sense resistor for the battery source.
Figure 14:
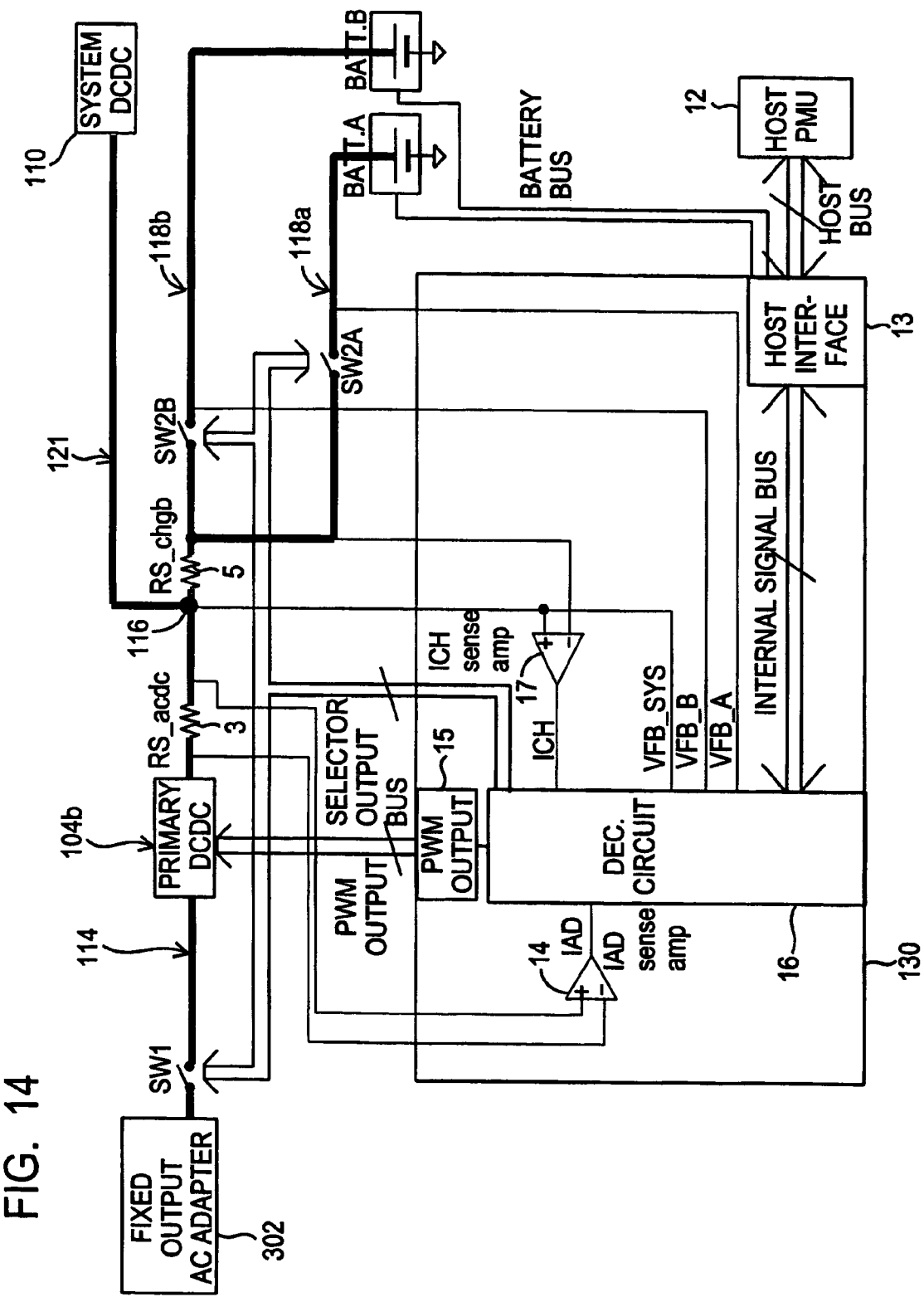
FIG. 14 is a more detailed block diagram of yet another embodiment of the power supply topology of FIG. 3 where the controllable DC power source is a DC to DC converter, the battery source includes a plurality of batteries, and the power supply system includes a DC to DC converter sense resistor at the output of the DC to DC converter and one battery sense resistor for the battery source.
Figure 15:
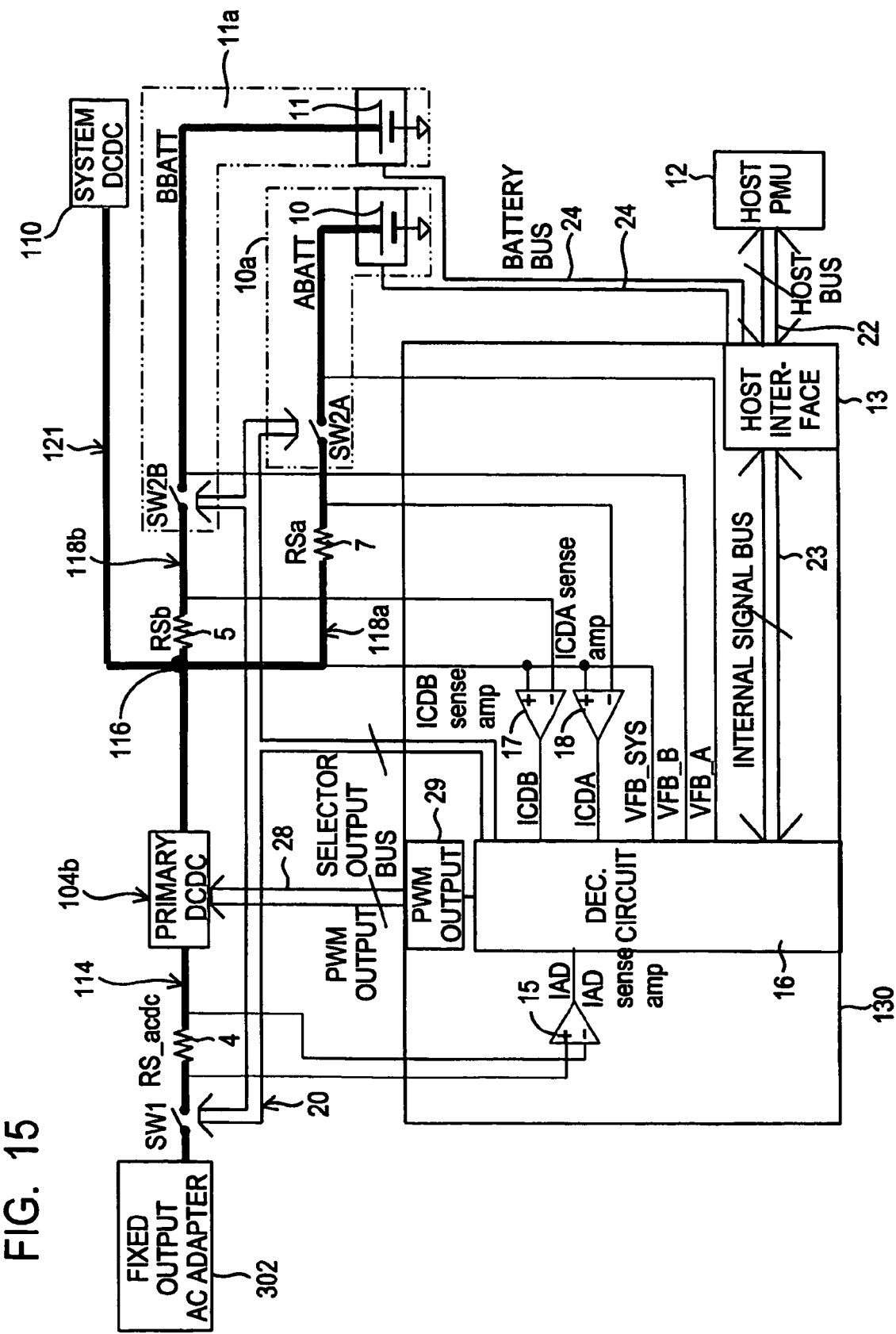
FIG. 15 is a more detailed block diagram of yet another embodiment of the power supply topology of FIG. 3 where the controllable DC power source is a DC to DC converter, the battery source includes a plurality of batteries, and the power supply system includes an adapter sense resistor at the output of the fixed adapter and a sense resistor for each battery.

The embodiment of FIG. 9 has a DC to DC converter sense resistor 4, a system sense resistor 3, a Battery A sense resistor 7, and a Battery B sense resistor 5. The embodiment of FIG. 10 has a DC to DC converter sense resistor 4, a Battery A sense resistor 7, and a Battery B sense resistor 5. The embodiment of FIG. 11 has a system sense resistor 3, a Battery A sense resistor 7, and a Battery B sense resistor 5. The embodiment of FIG. 12 has an adapter sense resistor 4 and one battery sense resistor 5 sensing current flow along path 118. The embodiment of FIG. 13 has one system sense resistor 3 and one battery sense resistor 5 sensing current flow along path 118. The embodiment of FIG. 14 has one DC to DC converter sense resistor 3 coupled in series along an output path of the DC to DC converter 104b, and one battery sense resistor 5. Finally, the embodiment of FIG. 15 has one adapter sense resistor 4 coupled to an output of the fixed adapter 302 and at an input to the DC to DC converter 104b, a Battery A sense resistor 7, and a Battery B sense resistor 5.

In certain instances, one or more batteries may be deeply discharged. That is, the output voltage level of the deeply discharged battery may be less than the minimum voltage level necessary for proper operation of the battery and/or the system. When charging such a deeply discharged battery, a wake up battery charging current level may be provided to the battery. This wake up battery charging current level is typically relatively small compared to the normal charging current, e.g., about 10% of normal charging current level in one instance. A wake up battery charging voltage level may also be relatively small compared to the normal charging voltage level. When the output voltage level of the battery rises above a wakeup threshold level, normal charging current and voltage levels may then be delivered. Otherwise, degradation of the battery may result if a normal charging current is provided to a deeply discharged battery.

In some battery supply topologies, the battery and the system load may be supplied by different power sources thus enabling one power source, e.g., a DC to DC converter, to provide a deeply discharged battery with a reduced charging current and voltage level while enabling the other power source, e.g., an ACDC adapter, to supply relatively higher current and voltage levels to the system load. In a battery supply topology consistent with the embodiment of FIG. 1 having one power source (e.g., controllable DC power source 104) that may provide power to both the system load 110 and to the battery 105 for charging (as in supply mode 183 of table 180), it would be advantageous to have an alternative method for providing a wake up charging current to the battery 105 while supplying the system load 110 with voltage levels as necessary.

Figure 16:
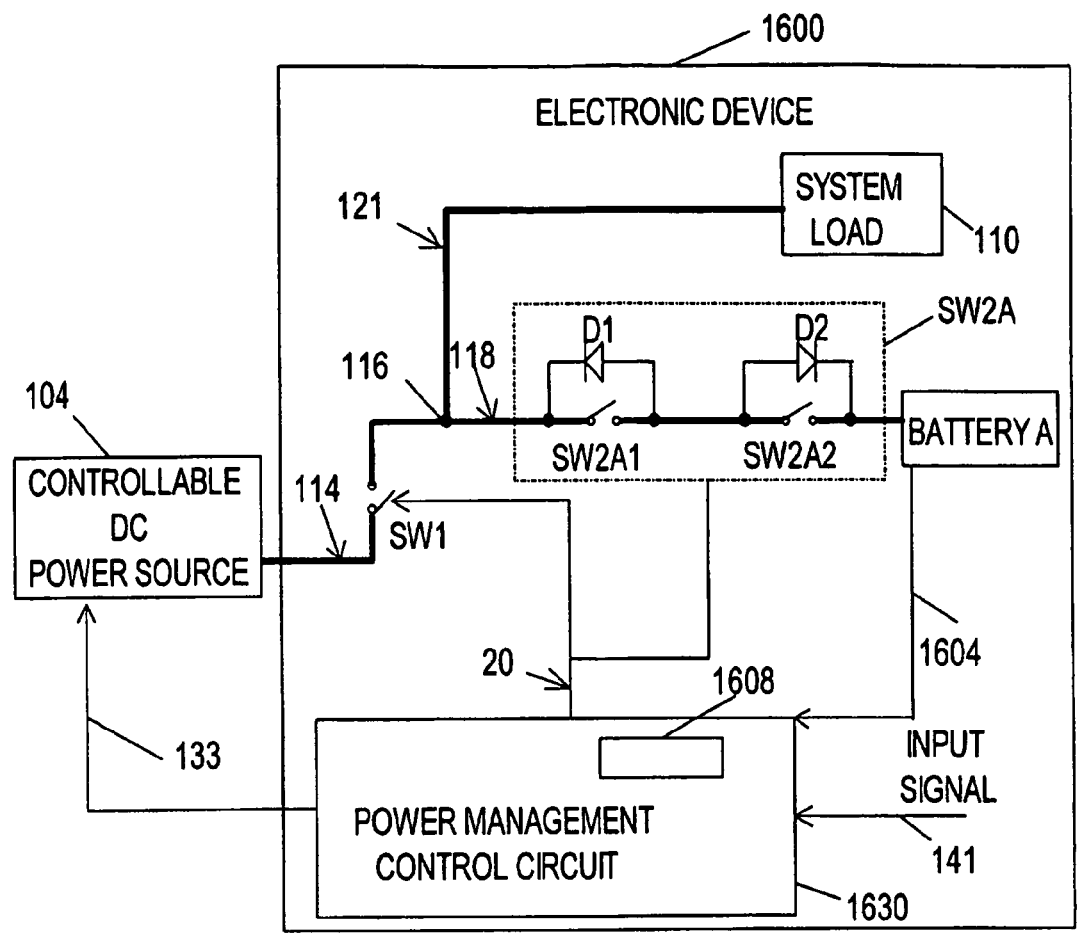
FIG. 16 is a block diagram of another embodiment of an electronic device having a wake up circuit to control charging current to a deeply discharged battery.

Turning to FIG. 16, another embodiment of an electronic device 1600 having a controllable DC power source 104 and Battery A that may, individually or together, provide power to the system load 110 is illustrated. FIG. 16 has similar components to earlier detailed components of FIG. 1 that are labeled similarly and hence any repetitive description of such components is omitted herein for clarity. For clarity only one battery, Battery A and its associated selectively unidirectional switch SW2A is illustrated in the embodiment of FIG. 16. Of course, additional batteries and additional associated selectively unidirectional switches in parallel with Battery A may also be utilized.

In the embodiment of FIG. 16, the selectively unidirectional switch SW2A for Battery A may be implement utilizes switches SW2A1 and SW2A2 having diodes D1 and D2 in parallel with each respective switch. Each individual switch SW2A1 and SW2A2 when closed may be bidirectional permitting current flow in both directions. However, when one of the switches SW2A1 and SW2A2 is open and the other is closed, the switch SW2A may function as a selectively unidirectional switch by allowing current to flow in one direction but blocking it in the opposite direction with the body diode, D1 or D2, in parallel with the open switch.

For instance, as detailed in table 1680, during a charging supply mode 183, switch SW2A1 may be ON and switch SW2A2 may be OFF. Therefore, charging current from the source 104 to Battery A is permitted to flow through closed switch SW2A1 and diode D2 in parallel with open switch SW2A2 to charge the battery. However, current flow in the reverse direction from Battery A to the system load 110 is prevented by diode D2 in this charging supply mode 183.

Advantageously, the power management circuit 1630 may include a wake up circuit 1608. The wake up circuit 1608 may be responsive to various input and/or command signals to provide a control signal to the selectively unidirectional switch SW2A along path 20. The control signal provided by the wake up circuit 1608 may be representative of a wake up charging condition or a normal charging condition. In response to a wake up charging condition signal, the selectively unidirectional switch SW2A may enable only a wake up charging current to flow towards Battery A. In response to a normal charging condition signal, the selectively unidirectional switch SW2A may enable normal charging current to flow towards Battery A.

Figure 17:
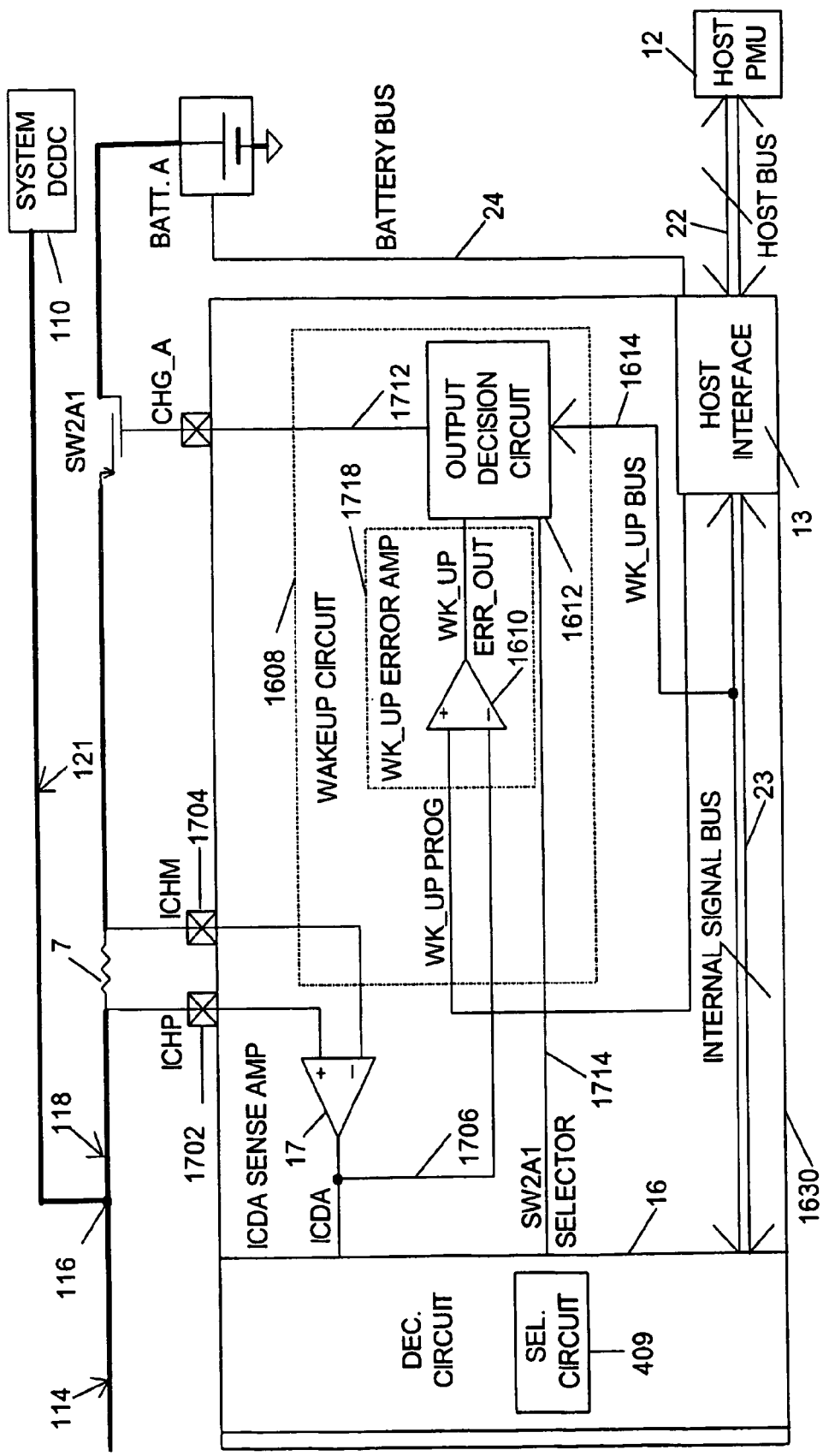
FIG. 17 is a more detailed block diagram of the power management and wake up circuit of FIG. 16.

Turning to FIG. 17, details of the power management control circuit 1630 and the wake up circuit 1608 of FIG. 16 are illustrated. For clarity, only switch SW2A1 of the selectively unidirectional switch SW2A of FIG. 16 is illustrated. The wake up circuit 1608 may include a comparison circuit 1718 and an output decision circuit 1612. The comparison circuit 1718 may include an error amplifier 1610. The error amplifier 1610 may receive an ICDA signal at its inverting input terminal representative of an instantaneous charging current level provided to Battery A when the system is in the charging supply mode 183 as detailed in table 1680. The ICDA signal may be provided by sense amplifier 17 via path 1706. Sense amplifier 17 may have its noninverting input coupled to terminal 1702 and its inverting input coupled to terminal 1704. Conductors may be coupled across Battery A sense resistor 7 and coupled to terminals 1702, 1704 to provide the input to the sense amplifier 17 representative of the charging current level provided to Battery A in a charging supply mode.

The error amplifier 1610 may also receive a signal at its noninverting input representative of a predetermined wake up current level. The predetermined wake up current level may be a fixed or programmable current level to account for varying battery sizes, types, and charging conditions. Such a signal representative of the wake up current level may be provided by a variety of sources including a host PMU 12 via the PMU host interface 13. The error amplifier 1610 then compares the signal representative of the instantaneous charging current level with the signal ICDA representative of the wake up current level and provides a comparison output signal to the output decision circuit 1612.

The output decision circuit 1612 of the wake up circuit 1608 receives a variety of input and/or command signals including the comparison output signal from the comparison circuit 1718 and a selector signal from a selector circuit 409 as provided via path 1714. The output decision circuit 1612 may provide either the comparison output signal or the selector signal to a control terminal of the switch SW2A1 to control a conduction state of the switch SW2A1. The output decision circuit 1612 may comprise a variety of logic circuits known in the art to provide the desired functionality.

When the output decision circuit 1612 provides the comparison output signal from the comparison circuit 1718 to the switch SW2A1, the switch SW2A1 is responsive to this signal to limit the charging current level provided to Battery A to the wake up current level. In one embodiment, the switch SW2A1 may provide a constant current flow to Battery A equal to the wake up charging current level. The comparison output signal may be an analog signal and the switch SW2A1 may be responsive to this analog signal to enter an intermediate conduction state. As used herein, an "intermediate conduction state" means a state that at least somewhat limits current flowing from one terminal to another terminal of the switch. As such, the switch SW2A1 in an intermediate conduction state may limit current provided to battery A to a wake up current level when the battery A is deeply discharged. In one instance, the switch SW2A1 may behave like an error amplifier controlled resistor when it receives the comparison output signal from the comparison circuit 1718.

The switch SW2A1 may be any variety of transistors to receive any variety of analog signals. For instance, the switch may be a field effect transistor as illustrated having a gate terminal to receive a voltage analog signal from the output decision circuit 1612. The value of this voltage analog signal then controls the current flowing between the other two terminals or the source and drain terminals in this instance. The switch 1612 may also be as bipolar junction transistor having a base terminal to receive a current analog signal from the output decision circuit 1612. The value of this current analog signal then controls the current flowing between the other two terminals or the collector and emitter terminals in this instance.

When the output decision circuit 1612 provides the selector output signal, the switch SW2A1 is responsive to this signal to be either ON or OFF. The signal provided by the selector circuit may be a digital signal such that if the digital signal is a digital one, switch SW2A1 may be ON and if the digital signal is a digital zero, switch SW2A1 may be OFF. When switch SW2A1 is ON in response to the selector output signal, the switch SW2A1 may be in a full conduction state. As used herein, a "full conduction state" means a state that does not appreciably limit current flowing from one terminal to another terminal of the switch. Therefore, if switch SW2A1 is ON in response to the selector output signal, normal charging current levels may then be provided to Battery A. Therefore, the comparison output signal, e.g., an analog signal in one embodiment, may be utilized to control switch SW2A1 when Battery A is deeply discharged and hence charging current may be limited to a wake up charging current level. In addition, the selector output signal, e.g., a digital signal in one embodiment, may be utilized to control switch SW2A1 and provide higher normal charging current levels to Battery A.

The output decision circuit 1612 may also accept additional input and/or command signals along bus 1614. Such signals may be provided by a host of sources including the host PMU 12 via the host interface 13, the power management control circuit 1630, or may also be set externally from the power management control circuit 1630. One such signal received along bus 1614 may be an enabling signal. If the enabling signal is in a first state, e.g., a digital one, the output decision circuit 1612 may be enabled to provide the comparison output signal from the comparison circuit 1718 to switch SW2A1. If the enabling signal is in a second state, e.g., a digital zero, the output decision circuit 1612 may then provide the selector output signal swA2 to the switch SW2A1.

Another signal that may be received by the output decision circuit 1612 via bus 1614 is a battery voltage signal representative of a maximum charging voltage during wake up charging. If this battery voltage signal indicates the voltage level of the battery during wake up charging exceeds a threshold voltage level, then the output decision circuit 1612 may stop wake up charging by providing the selector output signal to switch SW2A1 rather than the comparison output signal.

Yet another signal that may be received by the output decision circuit 1612 via bus 1614 is a maximum wake up charge time signal. If this signal indicates that the battery has been provided a wake up charging current for more than a maximum time interval, then the output decision circuit 1612 may stop wake up charging by providing the selector output signal to switch SW2A1. Other signals may also be provided to the output decision circuit 1612 to provide additional functionality.

In one embodiment, there is thus provided a wake up circuit comprising a comparison circuit adapted to receive a first signal representative of a charging current level provided to a battery via a path and a second signal representative of a predetermined wake up current level and to provide a comparison output signal in response to the first and second signal. The wake up circuit may also include an output decision circuit adapted to receive at least the comparison output signal and a selector signal from a selector circuit, the output decision circuit providing one of the comparison output signal and the selector signal to a switch to control a state of the switch, the switch coupled to the path.

In another embodiment, there is provided an apparatus comprising a wake up circuit consistent with the above detailed embodiment.

In yet another embodiment, there is provided an apparatus comprising: a first path configured to be coupled to a controllable DC power source; a second path configured to be coupled to a battery; a third path configured to be coupled to a system load, wherein the first, second, and third paths are coupled to a common node; a first switch coupled to the first path to allow selective coupling of the controllable DC power source to the system load via the common node; a second switch coupled to the second path to allow selective coupling of the battery to the common node; and a wake up circuit comprising a comparison circuit and an output decision circuit. The comparison circuit may be adapted to receive a first signal representative of a charging current level provided to the battery via the second path and a second signal representative of a predetermined wake up current level of the battery and to provide a comparison output signal in response to the first and second signal, the output decision circuit adapted to receive at least the comparison output signal and a selector signal from a selector circuit, the output decision circuit providing one of the comparison output signal and the selector signal to the second switch to control a state of the second switch.

The present invention further provides a new method for charging a battery with increased efficiency. Generally, a wake up circuit may receive (as shown for example in FIG. 17 referring to the wake up circuit 1608) a 'wake-up prog' signal, representative of a wake up current level. Conventionally, the wake up current delivered to the battery has a constant value Iwko, as predetermined by the voltage level of the 'wk-up prog' signal. Since the wake up charging process may be the first part of the battery charging process, until the battery voltage rises above a preset voltage threshold, the total charging time depends directly on the time required for the wake up charge process, i.e. the time period in which the voltage of a deeply discharged battery increases from an initial voltage Vbatto value to the wake up threshold voltage Vwkth. The voltage Vbatto of a deeply discharged battery may have virtually any value bellow Vwkth, and in the following, for simplicity, its lowest possible level will be considered as 0 V.

Since the charging time is an important performance parameter of a power management topology, the wake up charging time, as a component of the total battery charging time, has to be as short as possible. Accordingly, the wake up current level Iwko should be programmed at the highest allowable level. The restrictions that limit the maximum value of the wake up current may be imposed by various factors, but the most important factors are:

a battery related restriction (that may be expressed herein by a battery limited maximum wake up current Iwkmb) that takes into account battery features such as chemistry, size etc. and may be specified by the battery producer;

a power dissipation related restriction (that may be expressed herein by a power dissipation limited maximum wake up current Iwkmp) that takes into account the maximum power dissipation Pm supported by a current flow controlling device (CFCD) driving the charging current to the battery (for example the transistor SW2A1 in the embodiment illustrated in FIG.17).

Figure 18A:
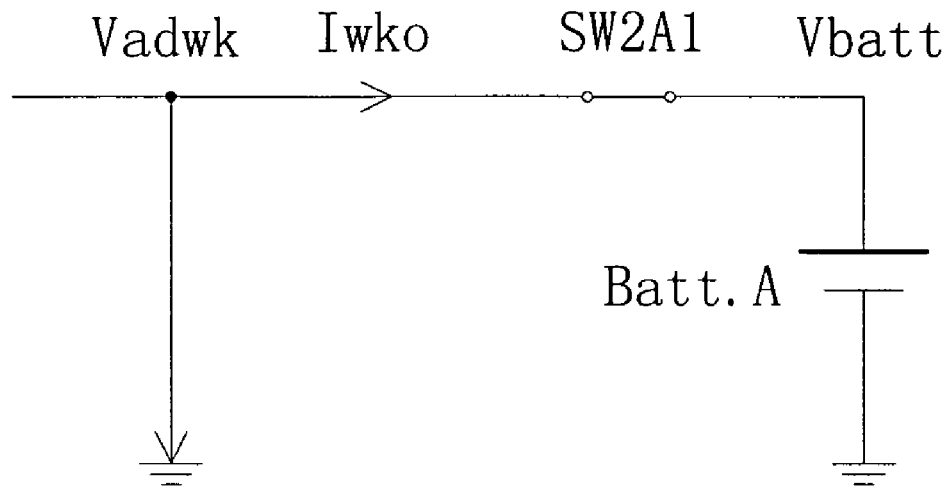
FIG. 18A is a simplified model for calculating the power dissipation Pwk on the switch SW2A1 receiving a constant current Iwko during wake up charge process.

FIG. 18A illustrates a simplified model for calculating the power dissipation Pwk on the current flow controlling device CFCD when driving a constant current Iwko during the wake up charging process. In FIG. 18A, Vadwk is a constant DC output voltage of the power supply during the wake up charging process. In order to ensure the flow of the wake up current Iwko, the value of the Vadwk voltage is set to be slightly higher (0.2~0.4V normally) than the maximum battery voltage during the wake up mode charging (the wake up battery voltage threshold, Vvkth), i.e. Vadwk=Vwkth+(0.2~0.4 V). The amount of instantaneous power dissipation Pwk on the current flow controlling device CFCD when the battery voltage is at an instantaneous value Vbatt is given by the following equation:

$$Pwk = Iwko * (Vadwk - Vbatt) \qquad (1)$$

Figure 18B:
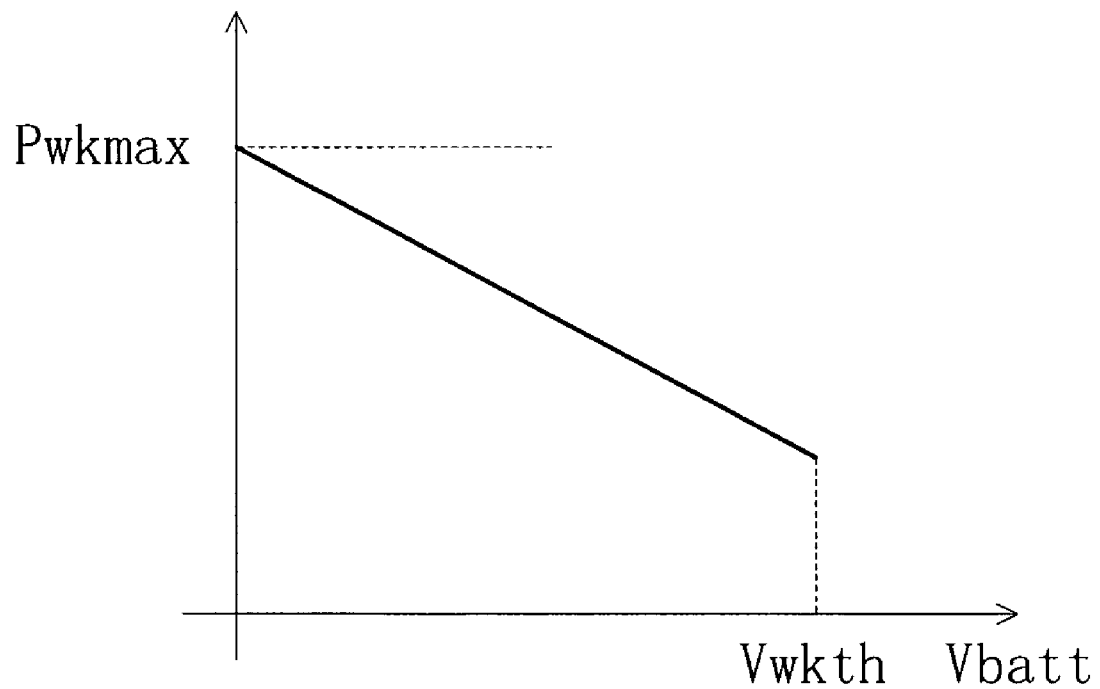
FIG. 18B is a plot illustrating the power dissipation Pwk on the switch SW2A1 versus the battery voltage Vbatt where the switch SW2A1 receives a constant current Iwko during wake up charge process.

FIG. 18B is a plot illustrating the power dissipation Pwk on the current flow controlling device CFCD versus the battery voltage Vbatt according to equation (1). It can be easily seen that the maximum power dissipation occurs at the lowest battery voltage and virtually that may be 0V. When calculating the power dissipation limited maximum wake up current level Iwkmp, the worst case of Vbatt=0 should be taken into consideration and the corresponding power dissipation should be equaled to the maximum allowable dissipation of the current flow controlling device, Pm. Therefore, in equation (1), if let Pm replace Pwk, Iwkmp replace Iwko and let Vbatt=0, then the value of the power dissipation limited maximum wake up current Iwkmp may be obtained as:

$$Iwkmp=Pm/Vadwk \quad (2)$$

In many cases, the power dissipation induced limit Iwkmp imposed to the maximum settable constant wake up current Iwko, is much more severe than the battery type related limit, that is, Iwkmp, as given by equation (2), is much lower than Iwkmb. For example, for a current flow controlling device having Pm=1.2 W and a constant DC power source output voltage of Vadwk=10V (which may be a reasonable value for a series 3 cell LiIon battery package), Iwkmp, as given by equation (2), would be 120 mA, while for the same battery the maximum allowable battery limited wake up current might be 300-400 mA.

However, setting the constant wake up current Iwko to its power dissipation limited value (120 mA in the above example) will degrade the circuit performance by resulting in a long wake up charging time. Meanwhile, again referring to the equation (2), to increase the Iwkmp limit level up the Iwkmb level would imply the use of a current flow controlling device having a rated power dissipation several times higher. Such a high power device is not cost effective and the corresponding high power dissipation lowers the wake up charging efficiency. Therefore there is a need in the art for an improved method and associated circuits able to maintain a reduced wake up charging time and a relatively low power current flow controlling device, at the same time.

Figure 19A:
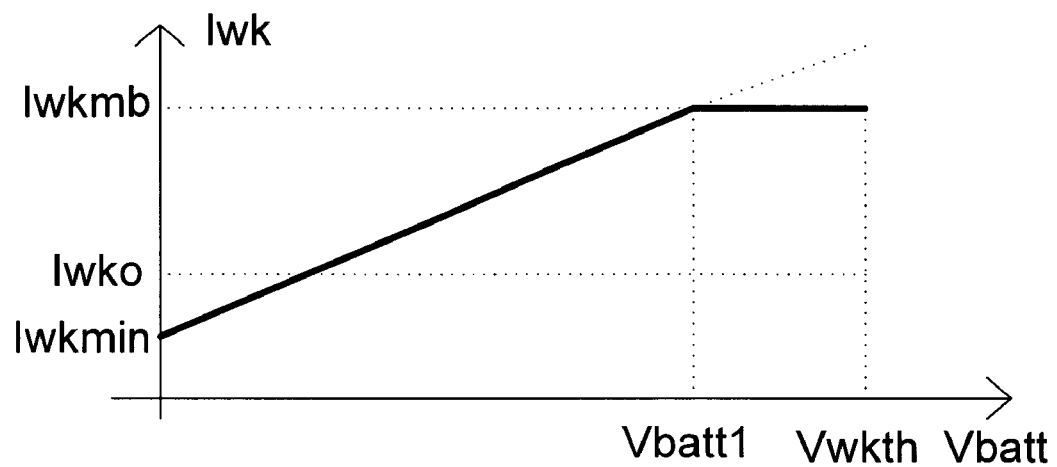
FIG. 19A is a plot illustrating a variable wake up current Iwk versus Vbatt.
Figure 19B:
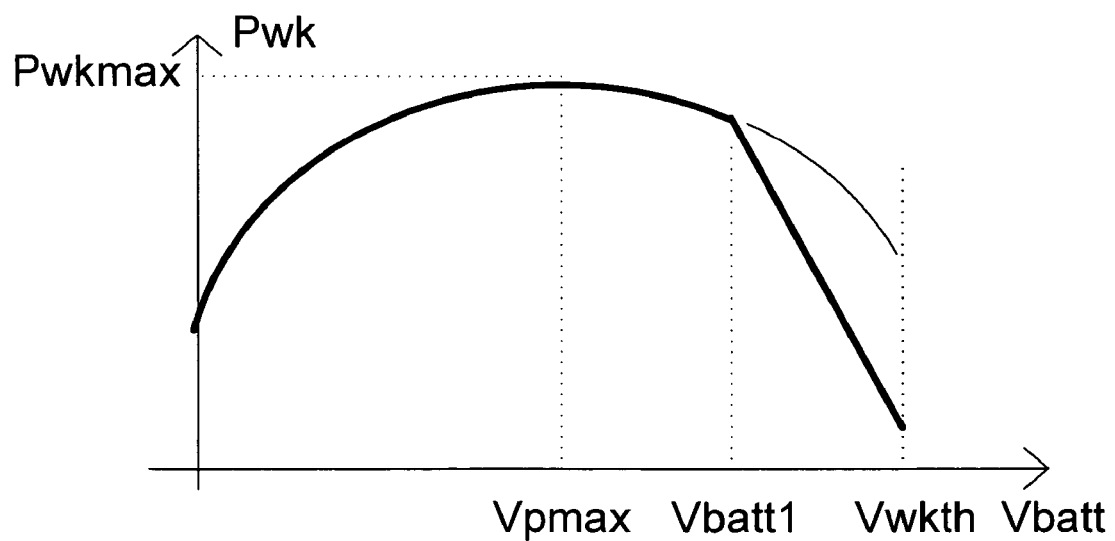
FIG. 19B is a Pwk versus Vbatt plot wherein a variable wake up current Iwk is provided.

FIG. 19A and FIG. 19B illustrate the principle of the method of controlling a wake up current, as proposed by the present invention. FIG. 19A is a plot illustrating a variable wake up current Iwk versus the instantaneous battery voltage Vbatt. FIG. 19B is a plot illustrating the power dissipation on a current flow controlling device Pwk versus the same battery voltage Vbatt. In the new method according to the present invention the constant wake up current Iwko is replaced with a battery voltage dependent wake up current Iwk, as shown in equation (3):

$$Iwk=Iwkmin+K*Vbatt \quad (3)$$

The wake up current Iwk has a minimum value for the lowest battery voltage (Iwkmin if the lowest battery voltage is assumed to be 0V) and is linearly increased by a constant factor K as the battery voltage Vbatt increases when battery voltages is lower than Vbatt1 (an associated battery voltage when the wake up current reaches the battery limited maximum wake up current Iwkmb), as depicted in FIG. 19A. The power dissipated on the current flow controlling device is now expressed by:

$$Pwk=(Ivwmin+K*Vbatt)(Vadwk-Vbatt) \quad (4),$$

which is the equivalent of equation (1) where the constant wake up current Iwko has been replaced with the variable wake up current of equation (3).

As resulting from a simple examination, the mathematical dependence of the power dissipation Pwk versus the battery voltage Vbatt in the relation (4) is parabolic, as represented, for battery voltages lower than Vbatt1, in FIG. 19B. Pwk has a maximum value Pwk max at a corresponding battery voltage Vpmax, both depending on the values chosen for the minimum wake up current Iwkmin and the for the constant factor K.

The charging method of the present invention imposes two conditions to the wake up current and power dissipation curves depicted in FIG. 19A and FIG. 19B. The first condition is to keep the power dissipation Pwk on the current flow controlling device bellow the device's maximum rated value Pm for all the battery voltages during wake up charging process. It simply comes to the condition Pwkmax≦Pm. The second condition is to have a wake up current higher than the one imposed by the power dissipation in the constant wake up current approach (i.e. Iwk>Iwkmp) for most of the battery wake up voltage range, since a high wake up current advantageously reduces the wake up charging time. Particularly, a multitude of associated Iwkmin, K pair values may be found by elementary mathematical means in order to concurrently satisfy the above mentioned two conditions.

Returning to the above given example of the wake up charging from a DC power source having an constant output voltage of Vadwk=10V with a wake up current driven through a current flow controlling device rated at Pm=1.2 W, if Iwkmin is set at 80 mA and the value of the factor K is set at K=30 mA/V and further assuming the battery wake up voltage threshold at Vwkth=9.6 V, according to equations (3) and (4) the wake up current will increase linearly from 80 mA to 368 mA when the battery charges from 0 to 9.6V and, respectively, the power dissipation will have a 1.2 peak value at Vbatt≈3.7 V. Meanwhile the wake up current will have a value above the Iwkmp=120 mA limit obtained in the constant wake up current approach from the moment the battery voltage reaches the value Vbatt=1.33 V. Compared with the method using a constant wake up current Iwko set at the power dissipation limited value Iwkmp=120 mA during the whole wake up charging process, the new method according to the present invention provides a variable wake up current which is above 120 mA for almost the whole battery wake up voltage range, which in turn advantageously reduces the wake up charging time.

As an additional feature, the new wake up charging method according to the present invention may contain the step of limiting the wake up current at a settable value (for example the battery type limited wake up current level Iwkmb), whenever the wake up current level as resulted from equation (3) exceeds the settable value. This case is also illustrated in the FIGS. 19A and 19B, where is assumed to occur for battery voltages exceeding Vbatt1.

Figure 20:
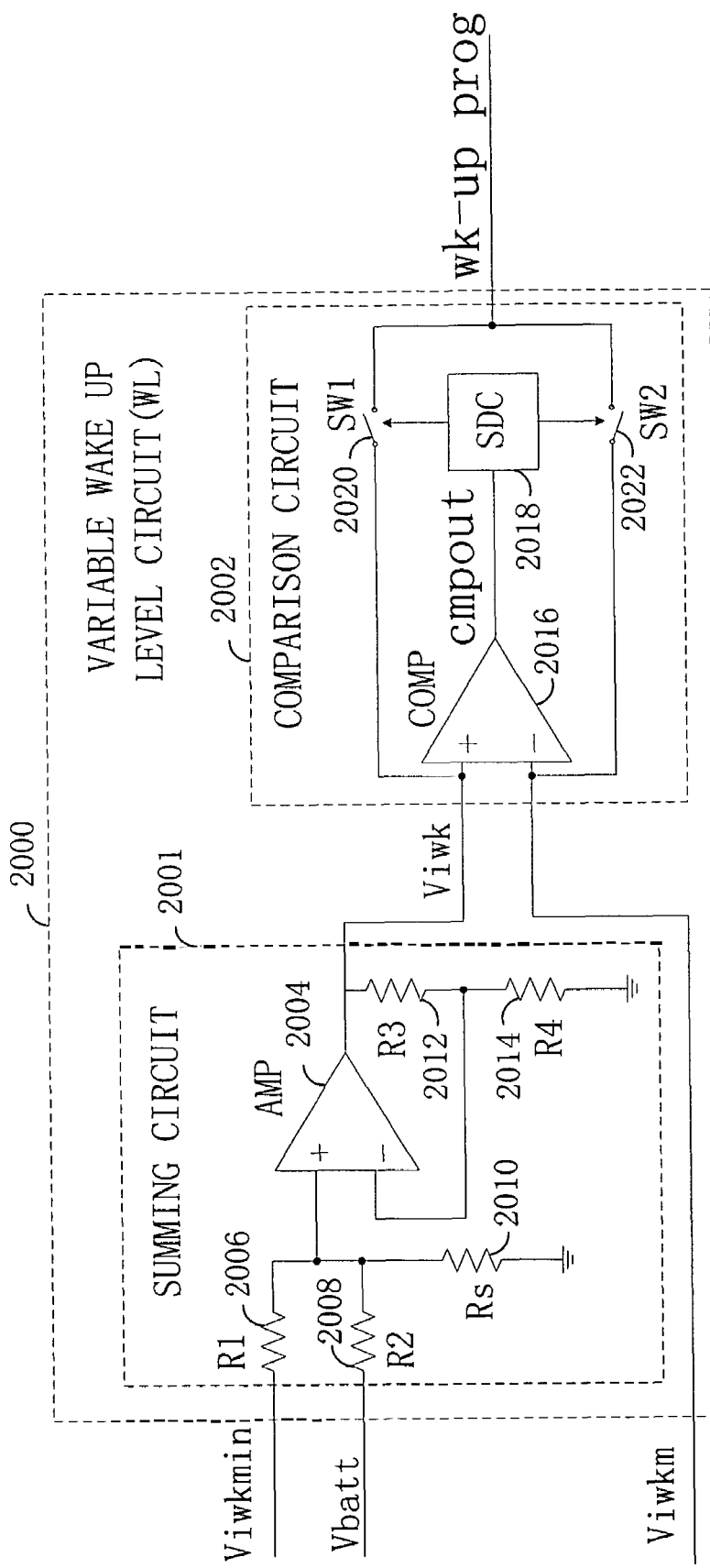
FIG. 20 illustrate an exemplary embodiment of a circuit that provides a variable wake up current.

The present invention provides yet another embodiment of a variable wake up level (WL) circuit configured to provide an output signal representative of a variable charging current to be delivered to a battery, in accordance with the above described new wake up charging method. FIG. 20 illustrates an exemplary embodiment of a variable wake up level WL circuit 2000, according to the present invention.

The WL circuit 2000 includes a summing circuit 2001 and a comparison circuit 2002. As those skilled in the art will easily recognize, the operational amplifier AMP 2004 together with the resistors R1 2006, R2 2008, R3 2012, R4 2014 and Rs 2010, connected as drawn in FIG. 20, may operate as the summing circuit 2001. It is also readily appreciated by those skilled in the art that the output voltage Viwk of the summing circuit 2001 is a linear combination of the two voltages Viwkmin and Vbatt which are applied through the resistors R1 and R2 respectively to the non-inverting input terminal (+) of the operational amplifier 2004, acting as a summing node. The output voltage of the summing circuit 2001 may then have the form:

$$Viwk = a*Viwkmin + b*Vbatt \quad (5)$$

If we make the notations: p=(R3+R4)/R4 and Rp=1/(1/R1+1/R2+1/Rs), then the equation (5) may be rewritten as:

$$Viwk = (p*Rp/R1)*Viwkmin + (p*Rp/R2)*Vbatt \quad (6)$$

and it becomes apparent that the coefficients in equation (5) namely a=(p*Rp)/R1 and b=(p*Rp)/R2, are exclusively dependent on the values chosen for the resistors R1, R2, R3, R4 and Rs. Furthermore the resistor values may be chosen such as a=1 and b=K*r, where r is a settable ratio of a representative voltage to the corresponding represented current and K is the constant factor in equation (3). In this case if Viwkmin is a representative voltage of the minimum wake up current Iwkmin in equation (3) the output voltage of the summing circuit 2001 Viwk will be representative of the variable wake up current level Iwk as expressed by the same equation (3). The signal Viwkmin may be provided externally to the WL circuit (as shown in FIG. 20) or may be internally generated and set by conventional circuitry within the WL circuit at an appropriate level.

Still referring to the embodiment illustrated in FIG. 20, the comparison circuit 2002 may include a comparator COMP 2016, a switch driving circuit SDC 2018 and two switches SW1 2020 and SW2 2022. The comparator 2016 compares the signal Viwk provided by the summing circuit 2001 with a settable constant level signal Viwkm, representative of a maximum wake up current Iwkm and delivers a digital output signal 'compout'. The maximum wake up current Iwkm may result from any limitation other than the power dissipation on the current flow controlling device, for example it might be equal to the battery limited maximum wake up current Iwkmb as previously described. The switch driving circuit 2018 is responsive to the digital output signal 'compout' of the comparator 2016 by keeping the switch SW1 closed and the switch SW2 open when Viwk is lower than Viwkm and by keeping the switch SW1 open and the switch SW2 closed when Viwk is higher than Viwkm. Accordingly, the output signal of the variable wake up level 2000 'wk-up prog' will have either the Viwk or the Viwkm level, whichever is lower.

It should be noted that the switches SW1 and SW2 in FIG. 20 may be implemented by any appropriately chosen variety of transistors, including bipolar or field effect transistors. It is readily appreciated by those skilled in the art that the switch driving circuit 2018 may be easily realized, for example, by any appropriate combination of logic gates and lever shifters, as long as it implements the above described function.

Figure 21:
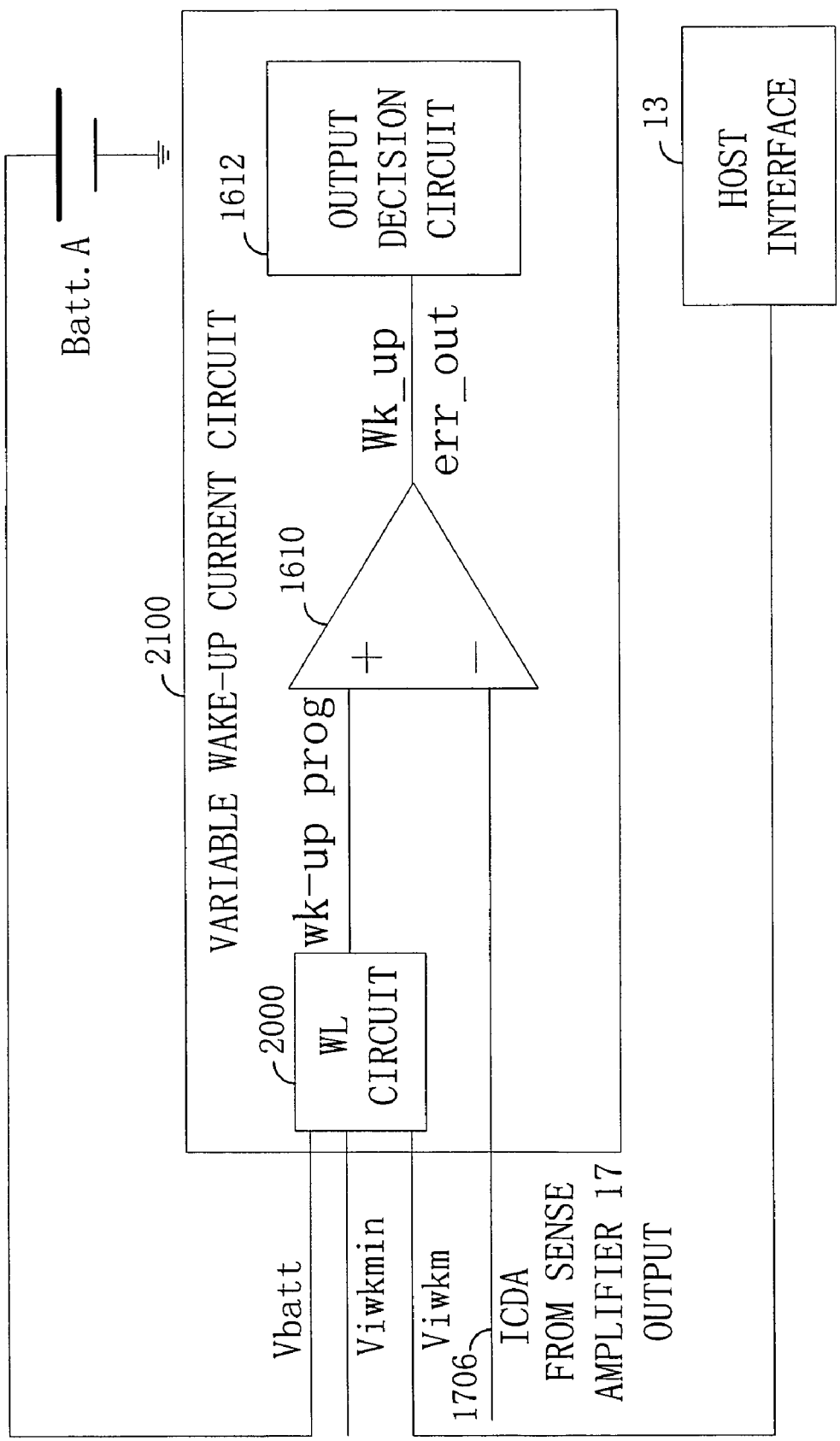
FIG. 21 illustrates an exemplary embodiment of power management topology similar to the one in FIG. 17 in which the circuit in FIG. 20 is inserted.

The present invention further provides an embodiment of a variable wake up current circuit (VWUC) able to at least control the wake up charging current delivered to a battery according to the previously described new method. FIG. 21 illustrates an exemplary embodiment 3000 of a variable current wake-up circuit according to the present invention. This variable wake-up current circuit may be inserted in a power management topology similar to the one in FIG. 17. For clarity, out of the elements contained in FIG. 17 only the elements functionally connected to the variable wake-up current circuit have been depicted.

In the embodiment illustrated in FIG. 21, the variable wake-up current circuit 2100 includes a variable wake up level WL circuit 2000, an error amplifier 1610 and an output decision circuit 1612 (also known as a driving circuit). The WL circuit 2000 has the structure and functionality as previously described in the present invention. It delivers a variable 'wk-up prog' signal, representative of a variable wake up charging current to be provided to the battery Batt. A through the switch SW2A1 acting as a current flow controlling device. The voltage level of the 'wk-up prog' signal increases linearly with the battery voltage Vbatt by a constant factor whose value is fully settable by the choose of the values of the resistors R1, R2, R3, R4, Rs within the WL circuit 2000. The voltage level of the 'wk-up prog' has a minimum value Viwkmin (also settable within the circuit 2000) for a 0V battery voltage and is limited to a maximum value set by the Viwkm signal, which, in the described embodiment, is provided through the host interface 13. The signal 'wk-up prog' is further provided to the non-inverting input of the error amplifier 1610. The inverting input of the error amplifier 1610 receives from a current sense amplifier (not shown in FIG. 21) a signal ICDA representative of the instantaneous charging current delivered to the battery Batt. A. The operation modes of both the error amplifier 1610 and output decision circuit 1612 may be identical to the ones described for the wake up circuit 1608 in FIG. 17 and for clarity and simplicity reasons the operation will not be further detailed.

It should be noted that the above described method or the circuits embodied the method can be used independently of or in conjunction with other battery charging methods or circuits, and/or as a part of a broader battery charging method or circuits.

It will be appreciated that the functionality described for the embodiments of the circuits that may also be implemented using software, or a combination of hardware and software. If implemented in software, a processor and machine-readable medium may be required. The processor can be any type of processor capable of providing the speed and functionality required by the embodiments of the invention. For example, the processor could be a process from the Pentium® family of processors made by Intel Corporation, or the family of processors made by Motorola. Machine-readable media include any media capable of storing instructions adapted to be executed by a processor. Some examples of such media include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g. floppy disk and hard drive), optical disk (e.g. CD-ROM), and any other device that can store digital information. In one embodiment, the instructions may be stored on the medium in a compressed and/or encrypted format.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalent.

What is claimed is:

1. A variable wake up level circuit for providing a wake up signal representative of a charging current to be delivered to a battery, said variable wake up level circuit comprising:

a signal processing circuit receiving a first settable voltage representative of a minimum wake up current and a third signal representative of a battery voltage, wherein said signal processing circuit adapted to produce a first output signal with a voltage level dependent on the voltage levels of said first settable voltage and said third signal; and a comparison circuit adapted to receive said first output signal and a second settable voltage representative of a maximum allowable wake up current and to produce said wake up signal, wherein said wake up signal having a voltage with a lower voltage level selected between said first output signal and said second settable voltage.

2. The circuit of claim 1, wherein said signal processing circuit being capable of setting said first output signal equal to said first settable voltage when said third signal is at a settable minimum voltage of said battery, and capable of enabling said first output signal to increase linearly by a settable factor with said third signal.

3. The circuit of claim 2, wherein said signal processing circuit comprising a summing-type circuit, said summing-type circuit comprising at least an operational amplifier and a plurality of resistors, the value of said settable factor being set by the choice of the values of said plurality of resistors.

4. The circuit of claim 3, wherein said summing-type circuit comprising:
a first input terminal receiving said first settable voltage;
a second input terminal receiving said third signal;
a summation output terminal outputting said first output signal;
an operational amplifier having an inverting terminal, a non-inverting terminal and an amplifier output terminal, wherein said summation output terminal being coupled to said amplifier output terminal;
a first resistor coupled between said first input terminal and said non-inverting terminal;
a second resistor coupled between said second input terminal and said non-inverting terminal;
a third resistor coupled between said inverting terminal and said summation output terminal;
a fourth resistor coupled between said inverting terminal and the ground; and
a fifth resistor coupled between said non-inverting terminal and the ground.

5. The circuit of claim 1, wherein said comparison circuit further comprising:
a comparator adapted to receive said first output signal at a first input terminal and said second settable voltage at a second input terminal and to produce a comparison output signal in response to the difference between said first output signal and said second settable voltage;
a switch driving circuit responsive to said comparison output signal by generating a first command signal and a second command signal;
a first switch coupled to said first input terminal of said comparator and to the output of said comparison circuit, said first switch responsive to said first command signal; and
a second switch coupled to said second input terminal of said comparator and to the output of said comparison circuit, said second switch responsive to said second command signal.

6. The circuit of claim 5, wherein said first and second switch having an ON state and an OFF state, said first switch being in ON state and said second switch being in OFF state when the voltage level of said first output signal is lower than said second settable voltage, said first switch being in OFF state and said second switch being in ON state when the voltage level of said first output signal is higher than said second settable voltage.

7. The circuit of claim 1, further comprising a reference voltage circuit, wherein said first settable voltage being provided to said signal processing circuit by said voltage reference circuit.

8. A variable wake up current circuit for at least setting and controlling a wake up current delivered to a battery via a current flow controlling device connected in series with a battery charging path, said variable wake up current circuit comprising:
a variable wake up level circuit, wherein said variable wake up level circuit being responsive to a first signal representative of an instantaneous voltage of said battery, a first settable voltage representative of a minimum wake up current of said battery and a second settable voltage representative of a maximum allowable wake up current of said battery, said variable wake up level circuit generating a wake up signal representative of said wake up current for charging said battery, wherein said wake up signal having a voltage level dependent at least on the voltage levels of said first settable voltage and said first signal;
an error amplifier receiving said wake up signal and a battery current sense signal representative of an instantaneous charging current of said battery, wherein said instantaneous charging current flowing through said current flow controlling device, and said error amplifier generating an error signal in response to a difference between said wake up signal and said battery current sense signal; and
a driving circuit adapted to output a device driving signal in response to at least said error signal, wherein said device driving signal capable of commanding said current flow controlling device to maintain said instantaneous charging current at a level based on said wake up signal.

9. The circuit of claim 8, wherein said variable wake up level circuit further comprising:
a signal processing circuit receiving said first signal and said first settable voltage, wherein said signal processing circuit adapted to produce a first output signal with a voltage level dependent on the voltage levels of said first signal and said first settable voltage; and
a comparison circuit adapted to receive said first output signal and said second settable voltage and to produce said wake up signal, wherein said wake up signal having a voltage with a lower voltage level selected between said first output signal and said second settable voltage.

10. The circuit of claim 9, wherein said signal processing circuit being capable of setting said first output signal equal to said first settable voltage when said first signal is at a settable minimum voltage of said battery, and capable of enabling said first output signal to increase linearly by a settable factor with said first signal.

11. The circuit of claim 10, wherein said signal processing circuit comprising a summing-type circuit, said summing-type circuit comprising at least an operational amplifier and a plurality of resistors, the value of said settable factor being set by the choice of the values of said plurality of resistors.

12. The circuit of claim 11, wherein said summing-type circuit comprising:
a first input terminal receiving said first settable voltage;
a second input terminal receiving said third signal;
a summation output terminal outputting said first output signal;
an operational amplifier having an inverting terminal, a non-inverting terminal and an amplifier output terminal, wherein said summation output terminal being coupled to said amplifier output terminal;
a first resistor coupled between said first input terminal and said non-inverting terminal;
a second resistor coupled between said second input terminal and said non-inverting terminal;
a third resistor coupled between said inverting terminal and said summation output terminal;

a fourth resistor coupled between said inverting terminal and the ground; and a fifth resistor coupled between said non-inverting terminal and the ground.

13. The circuit of claim 9, wherein said comparison circuit further comprises:

a comparator adapted to receive said first output signal at a first input terminal and said second settable voltage at a second input terminal and to produce a comparison output signal in response to a difference between said first output signal and said second settable voltage;

a switch driving circuit responsive to said comparison output signal by generating a first command signal and a second command signal;

a first switch coupled to said first input terminal of said comparator and to the output of said comparison circuit, said first switch responsive to said first command signal; and a second switch coupled to said second input terminal of said comparator and to the output of said comparison circuit, said second switch responsive to said second command signal.

14. The circuit of claim 13, wherein said first and second switch having an ON state and an OFF state, said first switch being in ON state and said second switch being in OFF state when the voltage level of said first output signal is lower than said second settable voltage, said first switch being in OFF state and said second switch being in ON state when the voltage level of said first output signal is higher than said second settable voltage.

15. The circuit of claim 8, wherein said variable wake up level circuit further comprising a reference voltage circuit, said first settable voltage being provided to said signal processing circuit by said voltage reference circuit.

16. A battery charging apparatus for charging a rechargeable battery, comprising:

a current path toward the rechargeable battery;

a current flow controlling device coupled in series with said current path, wherein said current flowing controlling device being adapted to control a charging current delivered to said battery; and a variable wake up current circuit, wherein said variable wake up current circuit being adapted to provide a device driving signal to said current flow controlling device in response to at least a first signal representative of an instantaneous voltage of said battery, a first settable voltage representative of a minimum value of a wake up charging current of said battery, a second settable voltage representative of a maximum allowable wake up charging current of said battery, and a battery current sense signal representative of the instantaneous charging current of said battery, wherein said current flow controlling device being adapted to receive said device driving signal on a command terminal and to maintain said charging current at a level dependent on the voltage level of said device driving signal.

17. The battery charging apparatus of claim 16, wherein said current flow controlling device having a rated maximum allowable power dissipation, said variable wake up circuit being further adapted to maintain the level of said device driving signal to ensure the power dissipation on said current flow controlling device to be lower than said rated maximum allowable power dissipation for any battery voltage within a specified range.

18. The battery charging apparatus of claim 16, wherein said variable wake up current circuit further comprising:

a variable wake up level circuit, wherein said variable wake up level circuit receiving said first signal, said first settable voltage and said second settable voltage, said variable wake up level circuit generating a wake up signal representative of said wake up current for charging said battery, wherein said wake up signal having a voltage level dependent at least on the voltage levels of said first settable voltage and said first signal;

an error amplifier receiving said wake up signal and said battery current sense signal, wherein said error amplifier generating an error signal in response to a difference between said wake up signal and said battery current sense signal; and a driving circuit adapted to output said device driving signal in response to at least said error signal, wherein said device driving signal capable of commanding said current flow controlling device to maintain said instantaneous charging current at a level based on said wake up signal.

19. The battery charging apparatus of claim 18, wherein said variable wake up level circuit comprising:

a signal processing circuit receiving said first signal and said first settable voltage, wherein said signal processing circuit adapted to produce a first output signal with a voltage level dependent on the voltage levels of said first signal and said first settable voltage; and a comparison circuit adapted to receive said first output signal and said second settable voltage and to produce said wake up signal, wherein said wake up signal having a voltage with a lower voltage level selected between said first output signal and said second settable voltage.

20. The battery charging apparatus of claim 19, wherein said signal processing circuit being capable of setting said first output signal equal to said first settable voltage when said first signal is at a settable minimum voltage of said battery, and capable of enabling said first output signal to increase linearly by a settable factor with said first signal.

21. The battery charging apparatus of claim 19, wherein said signal processing circuit comprising a summing-type circuit, said summing-type circuit comprising at least an operational amplifier and a plurality of resistors, the value of said settable factor being set by the choice of the values of said plurality of resistors.

22. The battery charging apparatus of claim 21, wherein said summing-type circuit comprising:

a first input terminal receiving said first settable voltage;

a second input terminal receiving said third signal;

a summation output terminal outputting said first output signal;

an operational amplifier having an inverting terminal, a non-inverting terminal and an amplifier output terminal, wherein said summation output terminal being coupled to said amplifier output terminal;

a first resistor coupled between said first input terminal and said non-inverting terminal;

a second resistor coupled between said second input terminal and said non-inverting terminal;

a third resistor coupled between said inverting terminal and said summation output terminal;

a fourth resistor coupled between said inverting terminal and the ground; and a fifth resistor coupled between said non-inverting terminal and the ground.

23. The battery charging apparatus of claim 19, wherein said comparison circuit further comprises:

a comparator adapted to receive said first output signal at a first input terminal and said second settable voltage at a second input terminal and to produce a comparison output signal in response to the difference between said first output signal and said second settable voltage;

a switch driving circuit responsive to said comparison output signal by generating a first command signal and a second command signal;

a first switch coupled to said first input terminal of said comparator and to the output of said comparison circuit, said first switch responsive to said first command signal; and a second switch coupled to said second input terminal of said comparator and to the output of said comparison circuit, said second switch responsive to said second command signal.

24. The battery charging apparatus of claim 23, wherein said first and second switch having an ON state and an OFF state, said first switch being in ON state and said second switch being in OFF state when the voltage level of said first output signal is lower than said second settable voltage, said first switch being in OFF state and said second switch being in ON state when the voltage level of said first output signal is higher than said second settable voltage.

25. The battery charging apparatus of claim 18, wherein said variable wake up level circuit further comprising a reference voltage circuit, said first settable voltage being provided to said signal processing circuit by said voltage reference circuit.

26. The battery charging apparatus of claim 16, wherein said current flow controlling device comprising a bipolar or a field effect transistor.

* * * * *